US012388192B2

(12) United States Patent
Mendes et al.

(10) Patent No.: US 12,388,192 B2
(45) Date of Patent: Aug. 12, 2025

(54) ANTENNA ASSEMBLIES AND RELATED METHODS

(71) Applicant: Molex, LLC, Lisle, IL (US)

(72) Inventors: Jean-Louis Mendes, Staffanstorp (SE); Brian P. O'Malley, Martinsville, IN (US); Jason E. Deren, West Hartford, CT (US); Kevin J. Tagan, Torrington, CT (US); William E. Spink, Jr., Mooresville, IN (US); Gino Antonini, New Fairfield, CT (US); Nicholas Tooley, Mooresville, IN (US)

(73) Assignee: Molex, LLC

( * ) Notice: Subject to any disclaimer, the term of this patent is extended or adjusted under 35 U.S.C. 154(b) by 515 days.

(21) Appl. No.: 17/591,602

(22) Filed: Feb. 3, 2022

(65) Prior Publication Data

US 2022/0263249 A1 Aug. 18, 2022

Related U.S. Application Data

(60) Provisional application No. 63/150,594, filed on Feb. 18, 2021.

(51) Int. Cl.
*H01Q 21/06* (2006.01)
*H01Q 9/04* (2006.01)

(52) U.S. Cl.
CPC ......... *H01Q 21/065* (2013.01); *H01Q 9/0442* (2013.01)

(58) Field of Classification Search
CPC ....... H01Q 21/065; H01Q 9/0442; H01Q 1/42
See application file for complete search history.

(56) References Cited

U.S. PATENT DOCUMENTS

| | | | |
|---|---|---|---|
| 5,905,466 A | 5/1999 | Jha | |
| 2014/0085143 A1 | 3/2014 | Chang et al. | |
| 2015/0236424 A1 | 8/2015 | Panther | |
| 2016/0211585 A1* | 7/2016 | Chau | H01Q 21/062 |
| 2019/0020714 A1 | 1/2019 | Lee et al. | |
| 2019/0173184 A1 | 6/2019 | Kim | |
| 2020/0227826 A1 | 7/2020 | Washakowski et al. | |
| 2020/0295436 A1* | 9/2020 | Ueda | H01Q 21/065 |

FOREIGN PATENT DOCUMENTS

| | | |
|---|---|---|
| CN | 110474158 A * | 11/2019 |
| EP | 0957535 A1 * | 11/1999 |
| EP | 1311031 A1 | 5/2003 |
| JP | H11248545 A | 9/1999 |
| JP | 2015080031 A | 4/2015 |
| JP | 2021022920 A | 2/2021 |

(Continued)

OTHER PUBLICATIONS

International Search report and Written Opinion received for PCT application No. PCT/IB2022/051090, mailed on Apr. 22, 2022, 15 pages.

*Primary Examiner* — Dieu Hien T Duong

(57) ABSTRACT

Antenna elements with orientation angles from zero to ninety degrees from vertical are provided. A housing is provided to support the antenna elements. Among other features, each antenna element can include dielectric fillers to control electromagnetic coupling. The housing supporting the antenna assemblies can be saucer shaped and provides a ground reference.

20 Claims, 40 Drawing Sheets

(56) References Cited

FOREIGN PATENT DOCUMENTS

| | | | |
|---|---|---|---|
| KR | 20140090165 | A | 7/2014 |
| TW | 202013822 | A | 4/2020 |
| WO | 2011093154 | A1 | 8/2011 |
| WO | 2018236821 | A1 | 12/2018 |
| WO | 2019217521 | A1 | 11/2019 |
| WO | 2020084841 | A1 | 4/2020 |
| WO | 2020153098 | A1 | 7/2020 |

* cited by examiner

ANTENNA ASSEMBLIES AND RELATED METHODS

RELATED APPLICATIONS

This application claims priority to U.S. Provisional Application No. 63/150,594 filed on Feb. 18, 2021, which is incorporated herein by reference in its entirety.

TECHNICAL FIELD

This disclosure relates to the field of single and dual polarized antenna(s) for indoor and outdoor applications. For example, cellular (e.g. 5G, LTE) and Internet of Things (IoT) applications.

INTRODUCTION

This section introduces aspects that may be helpful to facilitate a better understanding of the described disclosure(s). Accordingly, the statements in this section are to be read in this light and are not to be understood as admissions about what is, or what is not, in the prior art.

It is a challenge to design antennas to meet a variety of electrical, mechanical & environmental conditions while maintaining acceptable operating parameters (e.g., bandwidth, return loss, gain, isolation, steering).

SUMMARY

The inventors describe various exemplary antenna assemblies that operate with acceptable operating parameters.

One inventive embodiment of may comprise an integrated antenna assembly. Such an assembly may comprise: a plurality of antenna elements (e.g., 4, 8, 16 or 32 elements), a plurality of dielectric filler elements, a plurality of dielectric elements, and a housing for enclosing and protecting the plurality of antenna, dielectric filler and dielectric elements and providing a ground reference for the assembly. In one exemplary embodiment the antenna elements may comprise rectangular patch antenna elements, for example.

The exemplary antenna elements may operate over one or more of exemplary, non-limiting, frequency bands such as 24250 MHz to 27500 MHz; 26500 MHz to 29500 MHz; 27500 MHz to 28350 MHz; 37000 MHz to 40000 MHz; and 39500 MHz to 43500 MHz. Alternatively, the antenna elements may operate (i) below the frequency bands above (e.g., below 6000 MHz frequency), (ii) in between one of the frequency bands above, such as between 28350 and 37000 MHz, and/or (iii) above the frequency bands set forth above, for example.

In one embodiment the assembly may comprise a wireless radio hub, for example.

The housing of the antenna assembly may comprise one or more of (i) end housings, (ii) middle housings and (iii) end housing caps, and may be composed of a dielectric material (e.g., a Liquid Crystal Polymer (LCP) material) or may be a diecast housing. Each of the one or more middle housings may comprise one or more opposing male and female connecting elements to connect a respective middle housing to another of the middle housings, or to one of the one or more end housings or to one or more of the end housing caps. Further, each of the female connecting elements may comprise a grooved slot for receiving one of the one or more opposed male connecting elements, and each of the male connecting elements may comprise a protruding tab, for example.

In embodiments, the antenna elements may be configured at an orientation angle of between 0 and 90 degrees, for example. In one particular embodiment, the antenna elements may be configured at an orientation angle of 75 degrees. In another, the antenna elements may be configured at 45 degrees. Still in another, the antenna elements may be configured at an angle of zero degrees. Yet further, a number of the plurality of antenna elements may be configured at an orientation angle of 45 degrees and one of the antenna elements of the plurality of antenna elements may be configured at an orientation angle of 0 degrees.

Yet further, the antenna assembly may comprise one or more poles, wherein each of the antenna elements are capacitively coupled or directly attached to one or more of the one or more poles, and each of the one or more poles may comprise a tuning section that affects electromagnetic properties of each pole (e.g., return loss). In embodiments, each such tuning section may comprise a conductive layer formed over a diffusion barrier layer (e.g., a stripped conductive layer and a diffusion layer) to, among other things, prevent solder from being drawn up a respective pole of the tuning section.

In embodiments, each of the dielectric filler elements of the assembly (i) may be configured between respective poles of the antenna assembly and the housing to control an impedance of each pole, (ii) may comprise at least two structures and (iii) may be composed of a LCP material, or, alternatively may be an integral structure, for example.

Still further, in embodiments each of the one or more poles and/or housing of an inventive antenna assembly may comprise one or more alignment structures.

In addition to the exemplary embodiments described above the inventors describe antenna assemblies comprising a housing that may be configured as a saucer-shape. Such a saucer-shaped housing may further comprise a substantially flat, circular center top surface having a plurality of angled ribs extending from the circumference of the surface towards a circumference of a substantially flat, circular bottom surface, where each rib may be configured at a substantially 45 degree angle from the top surface, for example.

Further, between adjacent ribs there may be configured angled, recessed surface portions, where each angled, recessed surface portion may be further configured with at least two apertures, and where the ribs and apertures are configured at an angle that corresponds to 45 degrees, for example.

Alternatively, in an embodiment, the top surface of such an antenna assembly may comprise at least one recessed portion configured with at least two apertures, and wherein the top surface and two apertures are configured at zero degrees.

In yet another embodiment, each angled, recessed surface portion may be configured with one aperture, where the ribs and aperture may be configured at an angle that corresponds to 45 degrees.

In a single-pole variation, the top surface may comprise at least one recessed portion configured with one aperture, where the top surface and the aperture are configured at zero degrees.

Other shaped housings are also provided by the inventors. For example, an antenna assembly may comprise a "donut-shape" housing. Such a housing may further comprise a substantially flat, central perimeter structure having a plurality of angled ribs extending from the circumference of the structure towards a circumference of a substantially flat, circular bottom surface, where each rib may be configured at a substantially 45 degree angle from the structure and there may be configured angled, recessed surface portions between adjacent ribs. Each angled, recessed surface portion may be configured with at least two apertures (dual-pole version), and where the ribs and apertures are configured at an angle that corresponds to 45 degrees, or may be configured with one aperture (single-pole version), where, again, the ribs and aperture are configured at an angle that corresponds to 45 degrees.

A further description of these and additional embodiments is provided by way of the figures, notes contained in the figures and in the claim language included below. The claim language included below is incorporated herein by reference in expanded form, that is, hierarchically from broadest to narrowest, with each possible combination indicated by the multiple dependent claim references described as a unique standalone embodiment.

BRIEF DESCRIPTION OF THE DRAWINGS

The disclosure is illustrated by way of example and not limited in the accompanying figures in which like reference numerals indicate similar elements and in which.

Figure 1A:
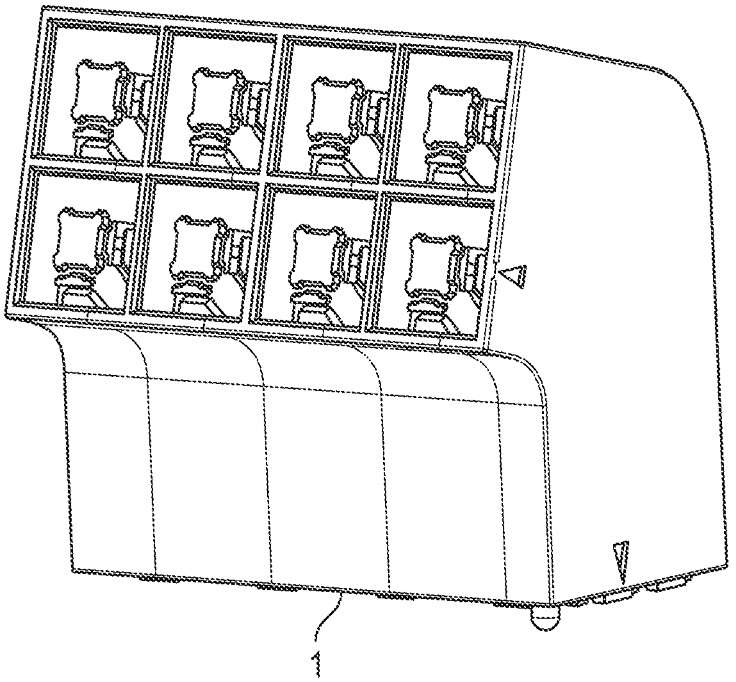
FIG. 1A depicts a view of an exemplary antenna assembly according to an embodiment.

Specific embodiments of the disclosure are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a more clear presentation of embodiments may be achieved. Further, dimensions and other parameters described herein are merely exemplary and non-limiting.

DETAILED DESCRIPTION OF THE PREFERRED EMBODIMENTS

Simplicity and clarity in both illustration and description are sought to effectively enable a person of skill in the art to make, use, and best practice the present disclosure in view of what is already known in the art. One skilled in the art will appreciate that various modifications and changes may be made to the specific embodiments described herein without departing from the spirit and scope of the present disclosure. Thus, the specification and drawings are to be regarded as illustrative and exemplary rather than restrictive or all-encompassing, and all such modifications to the specific embodiments described herein are intended to be included within the scope of the present disclosure. Yet further, it should be understood that the detailed description that follows describes exemplary embodiments and is not intended to be limited to the expressly disclosed combination(s). Therefore, unless otherwise noted, features disclosed herein may be combined together to form additional combinations that were not otherwise described or shown for purposes of brevity.

As used herein and in the appended claims, the terms "comprises," "comprising," or any other variation thereof is intended to refer to a non-exclusive inclusion, such that a process, method, article of manufacture, device or apparatus (e.g., a connector) that comprises a list of elements does not include only those elements in the list, but may include other elements not expressly listed or inherent to such process, method, article of manufacture, device or apparatus. The terms "a" or "an", as used herein, are defined as one, or more than one. The term "plurality", as used herein, is defined as two, or more than two. The term "another", as used herein, is defined as at least a second or more. Unless otherwise indicated herein, the use of relational terms, if any, such as "first" and "second", "top", "bottom", and the like are used solely to distinguish one entity or action from another entity or action without necessarily requiring or implying any actual such relationship, priority, importance or order between such entities or actions.

The term "coupled", as used herein, means at least the energy of an electric field associated with an electrical current in one conductor is impressed upon another conductor that is not connected galvanically. Said another way, the word "coupling" is not limited to either a mechanical connection, a galvanic electrical connection, or a field-mediated electromagnetic interaction though it may include one or more such connections, unless its meaning is limited by the context of a particular description herein.

The use of "or" or "and/or" herein is defined to be inclusive (A, B or C means any one or any two or all three letters) and not exclusive (unless explicitly indicated to be exclusive); thus, the use of "and/or" in some instances is not to be interpreted to imply that the use of "or" somewhere else means that use of "or" is exclusive.

The terms "including" and/or "having", as used herein, are defined as comprising (i.e., open language).

It should also be noted that one or more exemplary embodiments may be described as a method. Although a method may be described in an exemplary sequence (i.e., sequential), it should be understood that such a method may also be performed in parallel, concurrently or simultaneously. In addition, the order of each formative step within a method may be re-arranged. A described method may be terminated when completed, and may also include additional steps that are not described herein if, for example, such steps are known by those skilled in the art.

As used herein, "rectangular" denotes a geometry which includes a "square" geometry as an exemplary subset of rectangular geometry.

As used herein, the term "embodiment" or "exemplary" mean an example that falls within the scope of the disclosure.

Figure 1B:
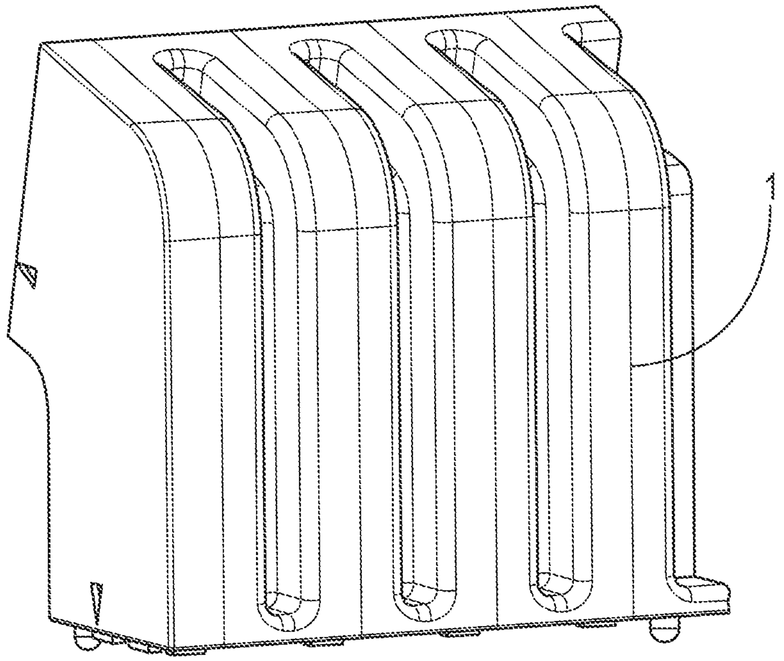
FIG. 1B depicts a different view of an exemplary antenna assembly according to an embodiment.
Figure 1C:
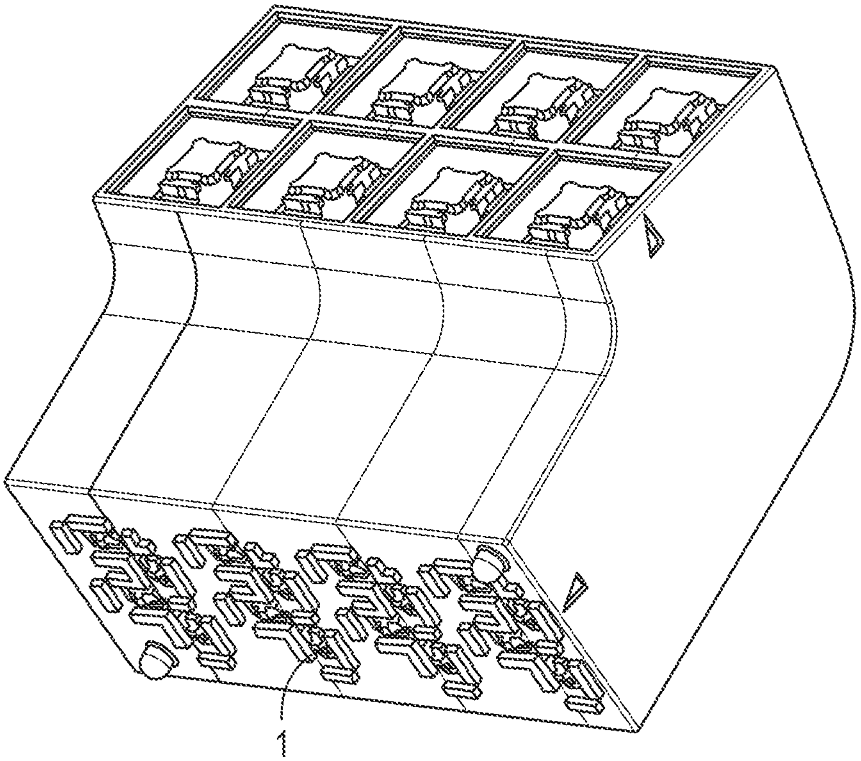
FIG. 1C depicts a different view of an exemplary antenna assembly according to an embodiment.

Referring now to FIGS. 1A to 1C there are depicted different views of an exemplary, inventive integrated antenna assembly 1 according to an embodiment. As depicted, the assembly 1 may be a combination of a rectangular, dual pole "patch" antenna and an antenna assembly (though a single pole antenna assembly is also within the scope of the present disclosure) that mechanically and electrically connects to telecommunications equipment (not shown; e.g., transmitters, receivers) operating, for example, at exemplary millimeter-wave frequencies. Exemplary frequency bands are provided below in Table 1:

TABLE 1:

24250 MHz to 27500 MHz
26500 MHz to 29500 MHz
27500 MHz to 28350 MHz
37000 MHz to 40000 MHz
39500 MHz to 43500 MHz

Notwithstanding the above frequency bands, it should be understood that the exemplary antenna assemblies may operate at different frequency bands than those set forth above. For example, alternative bands may be (i) below the frequency bands above (e.g., below 6000 MHz frequency), (ii) in between one of the frequency bands above, such as between 28350 and 37000 MHz, and/or (iii) above the frequency bands set forth above, for example.

One exemplary application for the inventive antenna assembly 1 is as a wireless radio hub, for example.

Figure 2:
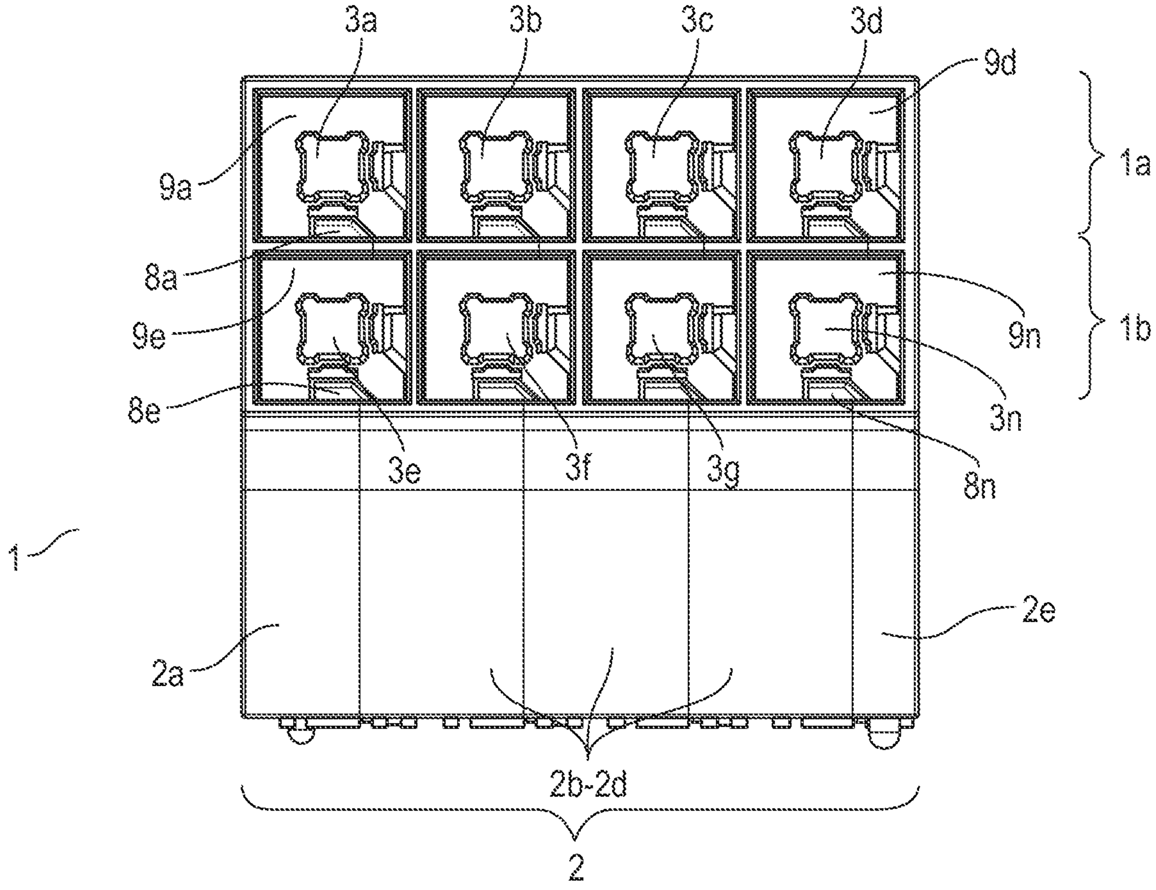
FIG. 2 depicts a front view of the exemplary antenna assembly in FIGS. 1A to 1C according to an embodiment.

FIG. 2 depicts a front view of the exemplary antenna 1 comprising, among other components, a plurality of central, substantially rectangular patch antenna elements 3*a* to 3*n* (where "n" indicates a last element), a plurality of dielectric filler elements 8*a* to 8*n*, a plurality of dielectric elements 9*a* to 9*n* and a housing 2 for enclosing and protecting elements 3*a* to 3*n*, 8*a* to 8*n*, 6*a* to 6*n* and 9*a* to 9*n*, as well as providing ground reference and the correct spacing/pitch for the elements 3a to 3n, Sa to Sn, 8a to 8n and 9a to 9n, among other elements. In the embodiment depicted in FIG. 2, the assembly 1 includes eight patch antenna elements 3a to 3n though this is merely exemplary and more, or less, elements may be included in an inventive assembly (e.g., 4, 16, 32, etc. . . . ). For ease of explanation, the antenna elements 3a to 3d may be referred to as being a part of an "upper antenna" while elements 3e to 3n may be referred to as being a part of a "lower antenna".

The exemplary housing 2 is shown comprising a single end housing 2a, three middle housings 2b to 2d and a single end housing cap 2e where each of the housings may protect, or may be associated with, one or more elements 3a to 3n, for example. It should be understood that this number of end housings, middle housings and housing end caps is also exemplary and more of less of such housing components may be included depending on the number of elements 3a to 3n, for example. In an embodiment, the housings may be composed of a dielectric material having a dielectric constant and plating that facilitates proper electrical performance along with the correct physical and mechanical properties that facilitate proper mechanical and environmental performance (e.g., a liquid crystal polymer or "LCP"). In an alternative embodiment, the housing may be a diecast housing.

Figure 3A:
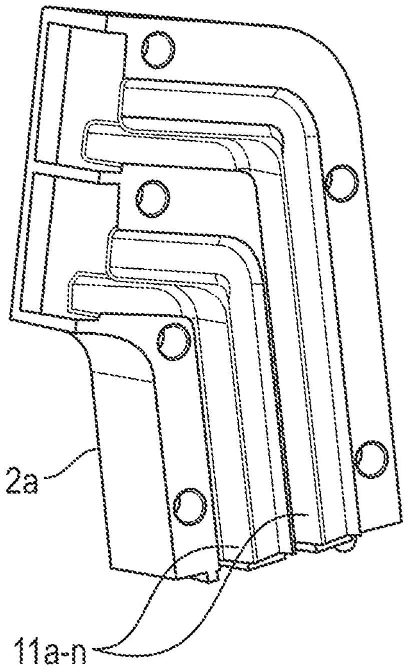
FIG. 3A depicts a view of a housing component of an antenna assembly according to an embodiment.
Figure 3B:
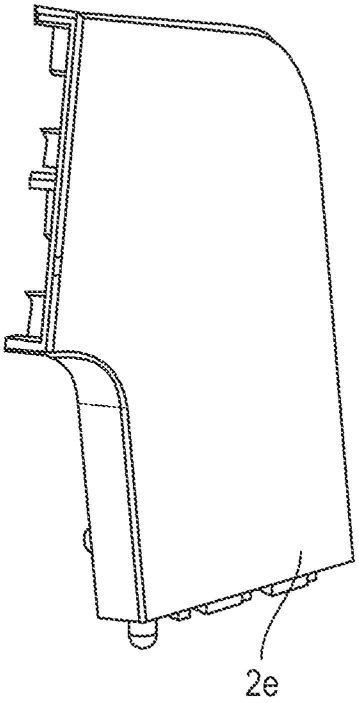
FIG. 3B depicts a view of a housing component of an antenna assembly according to an embodiment.
Figure 3C:
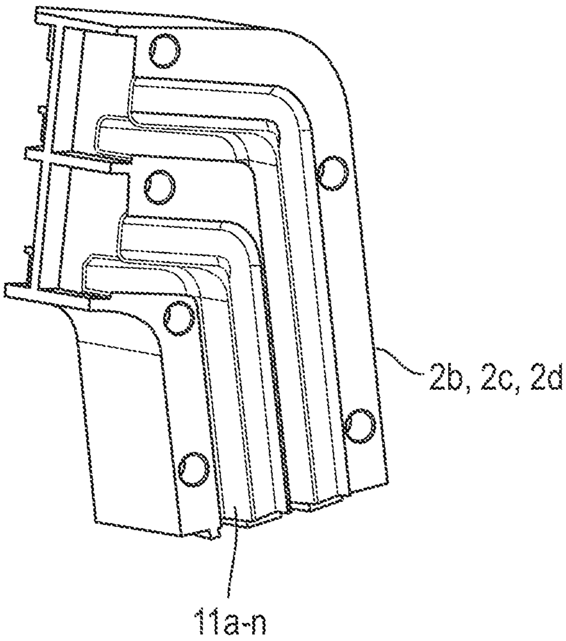
FIG. 3C depicts a view of a housing component of an antenna assembly according to an embodiment.

FIGS. 3A to 3C depict additional views of a single end housing 2a, middle housings 2b to 2d and a single end housing cap 2e without elements 3a to 3n enclosed therein according to an embodiment. As shown, each housing (e.g., 2a to 2e) may be configured to include one or more channels 11a to 11n. In an embodiment, each channel 11a to 11n may be configured to receive a lengthwise transmission portion of an electrical pole (hereafter "lengthwise portions") (lengthwise portions not shown in FIGS. 3A to 3C; but see components 14a, 14aa, 15a and 15aa in FIGS. 5C and 6), among other components.

Figure 4A:
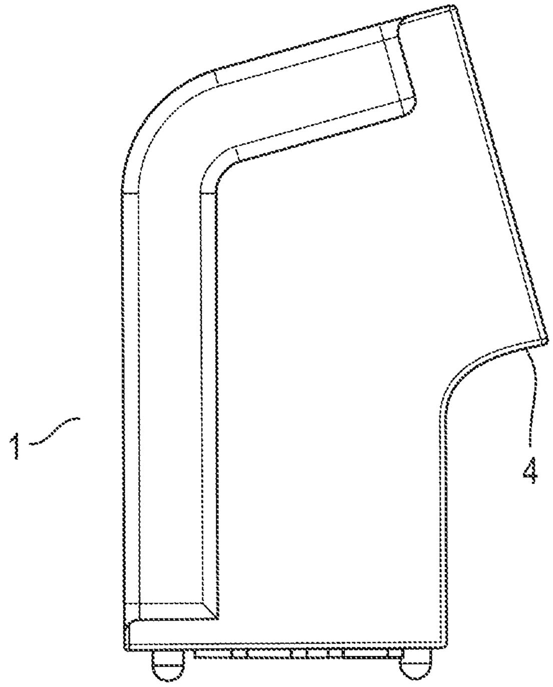
FIG. 4A illustrates a view of an inventive antenna assembly according to an embodiment.
Figure 4B:
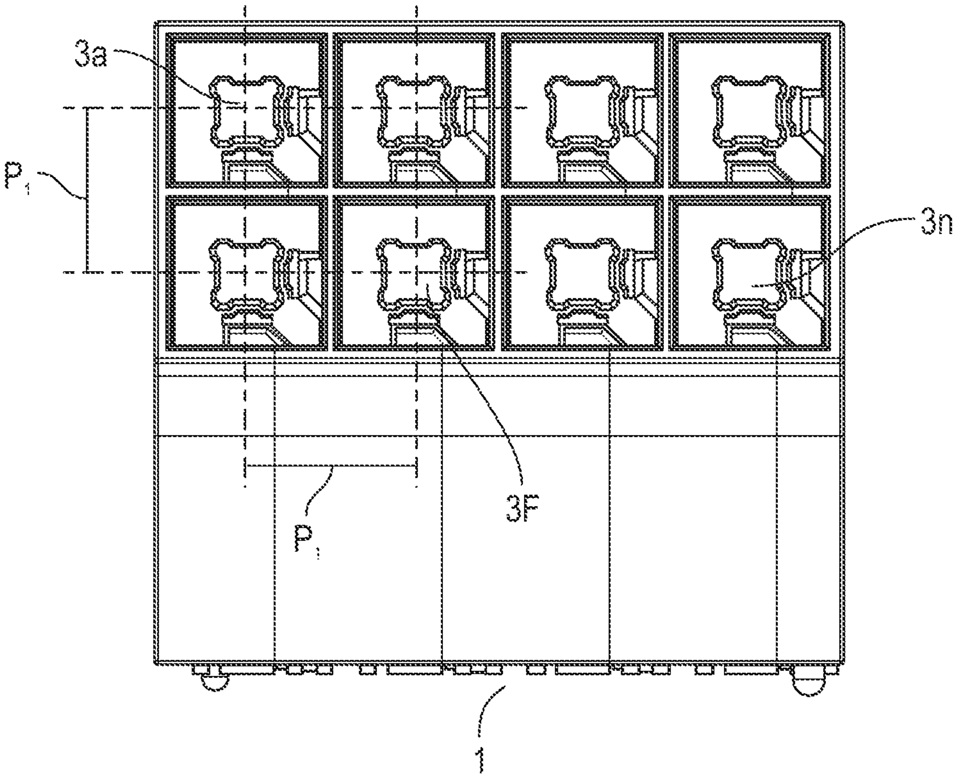
FIG. 4B illustrates a different exemplary view of an inventive antenna assembly according to an embodiment.

FIGS. 4A and 4B illustrate exemplary dimensions of the inventive assembly 1 though, once again, it should be understood that these dimensions are merely exemplary and other dimensions may be used depending on the number of elements 3a to 3n (e.g., the height 20.9 mm, may be 18.5 mm or 12 mm) and/or the orientation angle of the assembly 1 (i.e., tilt degrees of the elements 2a to 2n of assembly 1 from the vertical axis). In the embodiment depicted in FIG. 4A the assembly 1 is configured with elements 3a to 3n having an orientation angle 4 of 75 degrees though this too is exemplary. In additional embodiments, this angle may comprise an angle between 0 to 90 degrees, for example.

In FIG. 4B a dimension is denoted "P1" (for "pitch"). This dimension may be measured from the centerline of one element (e.g., 3e) to the centerline of another adjacent element (e.g., 3a or 3f). It should be understood that in accordance with embodiments of the present disclosure, the value of the pitch dimension between each element may change as the operating frequency of an element 3a to 3n is changed (e.g., the pitch of a patch antenna operating at 24250 MHz is different than the pitch of a patch antenna operating at 37000 MHz).

Figure 5A:
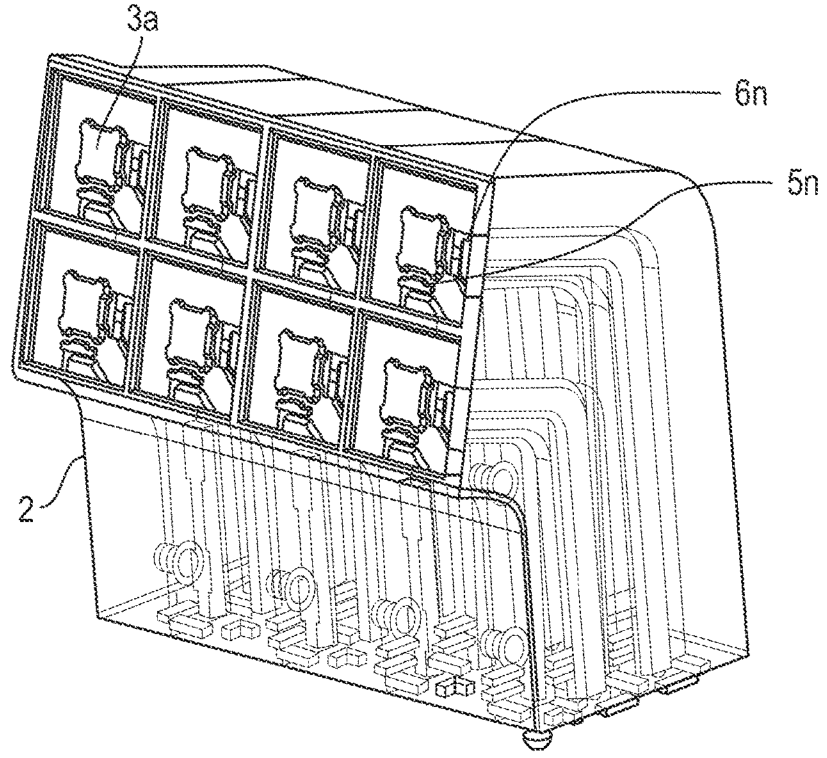
FIG. 5A illustrates a view of an inventive antenna assembly that permits the reader to view elements of the assembly enclosed within the assembly's housing according to an embodiment.
Figure 5B:
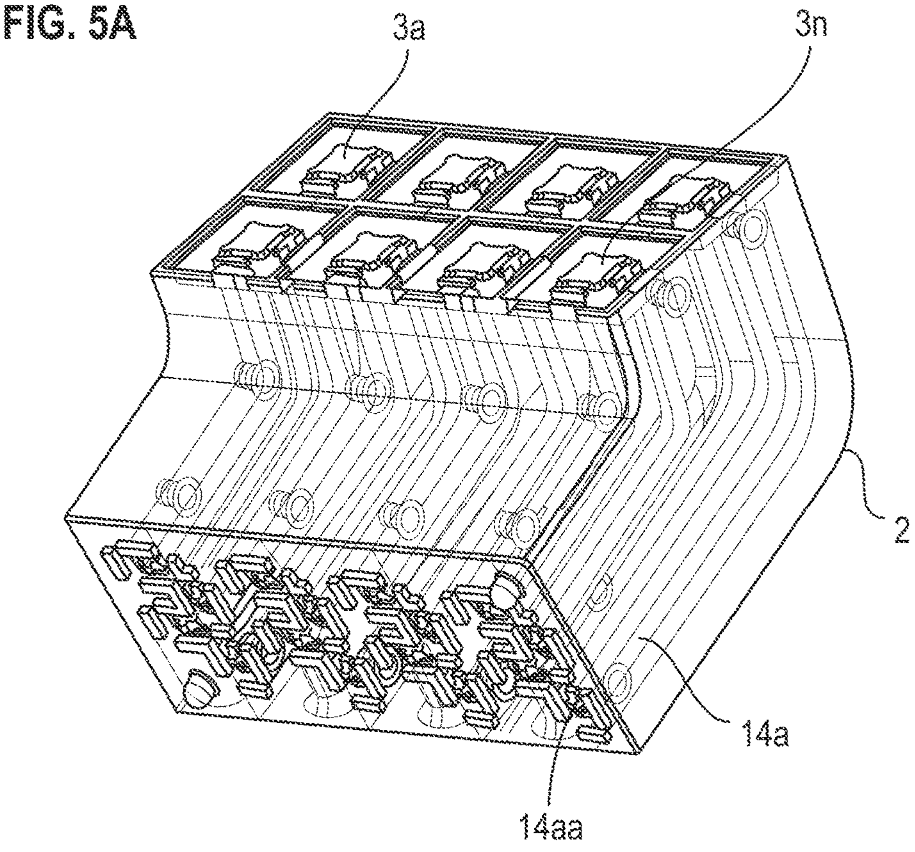
FIG. 5B illustrates a different view of an inventive antenna assembly that permits the reader to view elements of the assembly enclosed within the assembly's housing according to an embodiment.
Figure 5C:
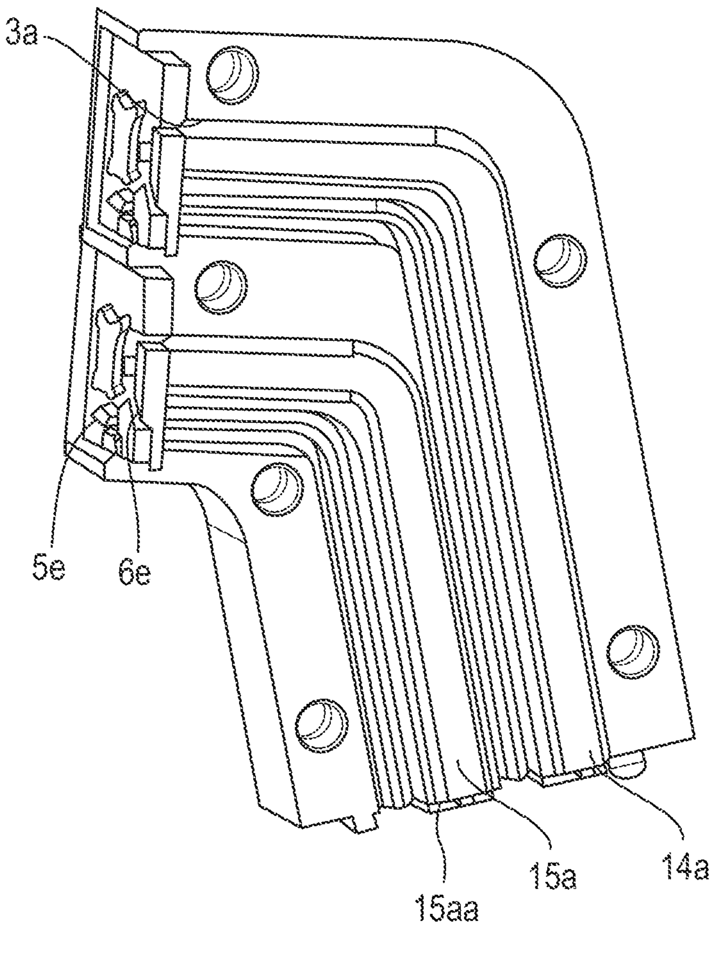
FIG. 5C illustrates a different view of an inventive antenna assembly that permits the reader to view elements of the assembly enclosed within the assembly's housing according to an embodiment.

Referring to FIGS. 5A to 5C there is illustrated a view of assembly 1 where the housing 2 is transparent. It should be understood that the transparent housing 2 is shown in order to allow the reader to see how the elements of the assembly 1 are enclosed by the housing 2. For example, lengthwise portions 14a, 14aa, and 15a, 15aa of electrical poles 5b, 6b and 5e, 6e, respectively are shown it being understood that in a single pole version only one lengthwise portion would be required.

Figure 6:
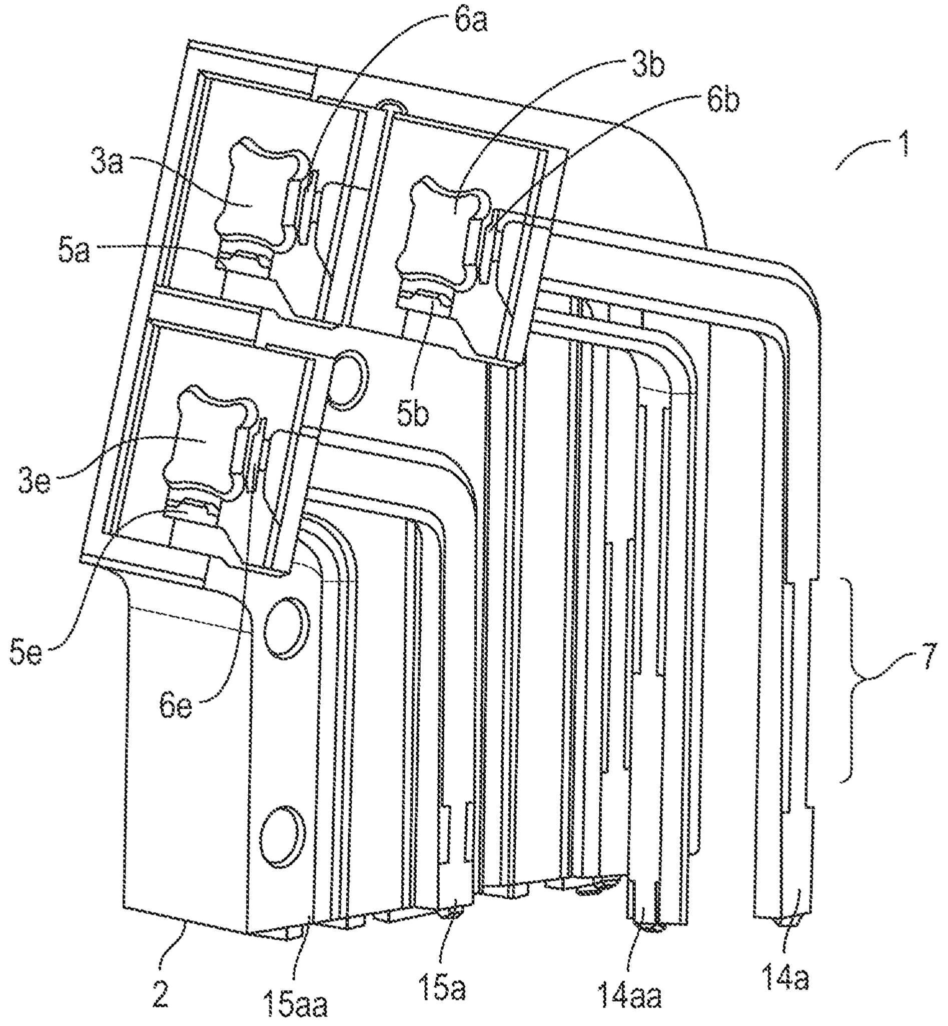
FIG. 6 depicts a section of an inventive antenna assembly that shows a pair of patch antenna pole elements according to an embodiment.

Turning now to FIG. 6, there is depicted a section of assembly 1. More particularly, three central, patch antenna elements 3a, 3b and 3e are shown. In an embodiment, each element 3a to 3n may be capacitively coupled or directly attached to a pole 5a to 5n, 6a to 6n (only a few poles are show in the figure). For example, patch element 3a may be capacitively coupled or directly attached to poles 5a, 6a, patch element 3b may be capacitively coupled to poles 5b,6b and patch element 3e may be capacitively coupled to poles 5e, 6e where it is understood that in the dual-pole embodiment depicted, one pole allows an exemplary patch antenna to transmit or receive electromagnetic signals, at certain frequencies, that are polarized along one linear axis (e.g., x-axis) and the other pole allows the patch antenna to transmit or receive electromagnetic signals that are polarized along another orthogonal linear axis (e.g., y-axis)(i.e., the relative orthogonal orientation of each individual pole within each pair is representative of a dual-pole patch antenna configuration). For the sake of clarity, each antenna element 3a to 3d of an upper antenna 1a may be associated with a "long electrical pole" ("long pole" for short) and a "short electrical pole" ("short pole") (e.g., long pole 6b comprising lengthwise portion 14a and short pole 5b comprising lengthwise portion 14aa for element 3b) and each element 3e to 3n of a lower antenna 1b may also be associated with a long pole and a short pole as well (e.g., long pole 6e comprising lengthwise portion 15a and short pole 5e comprising lengthwise portion 15aa for element 3e), for example. Again, it being understood that in a single pole version only one lengthwise portion would be required.

Also shown is an exemplary tuning section 7. Though only a single tuning section 7 is labeled for ease of understanding (i.e., all of the tuning sections are not labeled in FIG. 6), each pole 5a to 5n, 6a to 6n may comprise such a tuning section 7. In accordance with an embodiment of the disclosure, each tuning section (e.g., section 7) functions to affect the electromagnetic properties of each pole 5a to 5n, 6a to 6n. For example, pole 6b may comprise tuning section 7. In an embodiment, a tuning section may comprise a so-called "dog bone" shaped section that functions to affect the electromagnetic coupling properties of each pole (e.g., the longer the "dog bone" section, the more of an effect on a dipole). In this manner electromagnetic properties of a single or dual pole antenna may be controlled in order to achieve a desired set of design criteria (e.g., maximize the return loss (minimize reflections) of each electrical pole for optimum overall performance).

Figure 7A:
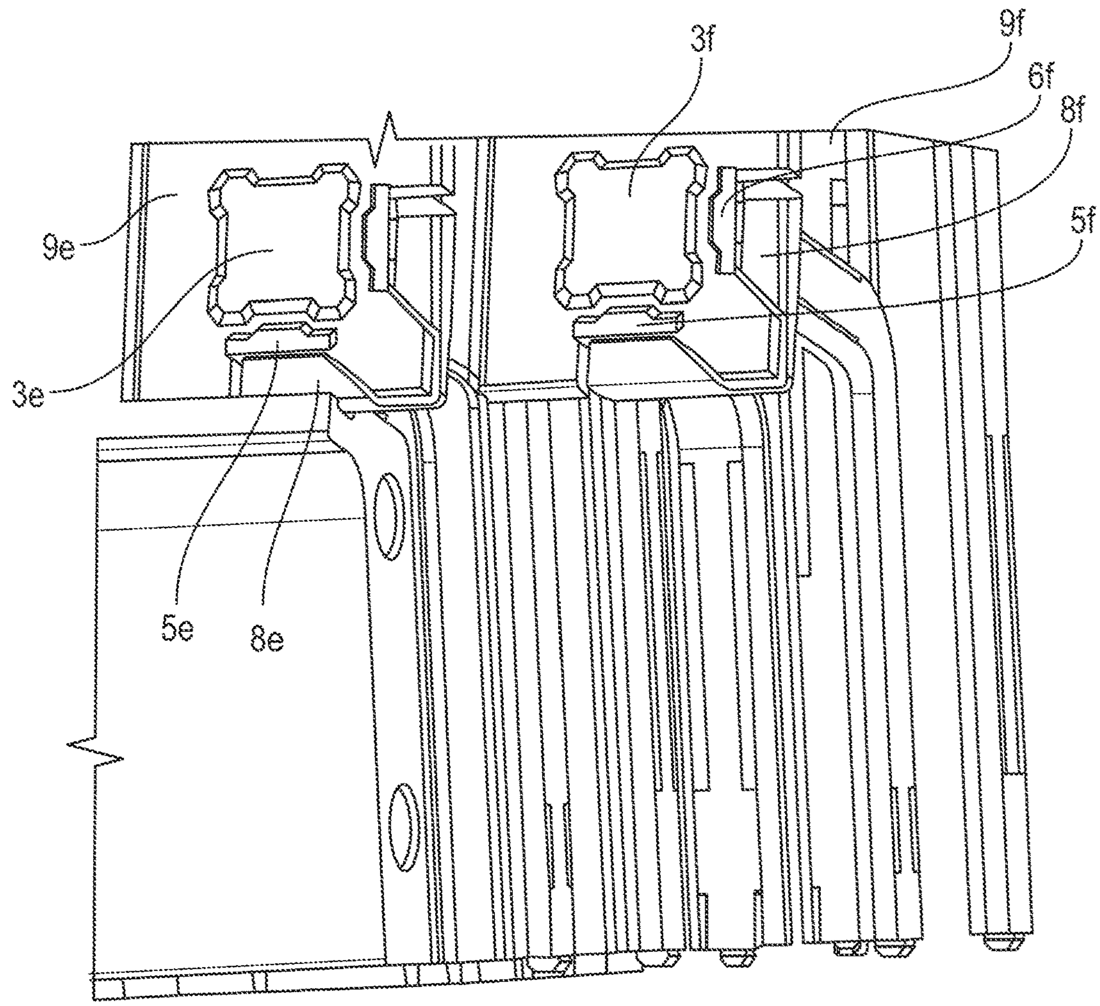
FIG. 7A depicts a view of an inventive antenna assembly that includes dielectric filler elements according to an embodiment.

In addition to the elements described above, as described previously each assembly 1 may further comprise one or more dielectric filler elements. Referring now to FIG. 7A there is shown central, rectangular patch antenna elements 3e, 3f, each of which is associated with dual poles 5e, 6e or 5f, 6f (where a signal may be transmitted from an end of each pole), respectively, and at least one dielectric filler element 8e, 8f, respectively, configured between a respective dual pole pair 5e, 6e and/or 5f, 6f and housing 2. Though only filler elements 8e, 8f are shown in FIG. 7A it should be understood that at least one respective dielectric filler element 8a to 8n is configured between dual pole pair 5a to 5n or 6a to 6n and the housing 2, it being understood that a single pole version also includes such a dielectric filler element.

In an embodiment, each dielectric filler element 8a to 8n associated with each pole of an antenna element may function to fill an air gap so as to control the impedance of an individual pole 5*a* to 5*n* or 6*a* to 6*n*, and may be composed of material consisting of a dielectric constant that functions to provide the correct physical and mechanical properties that facilitate a desired electrical, mechanical and environmental performance (e.g., an LCP an example of which is made by the Celanese Corporation, Model LKX1761, Zenite LCP).

Figure 7B:
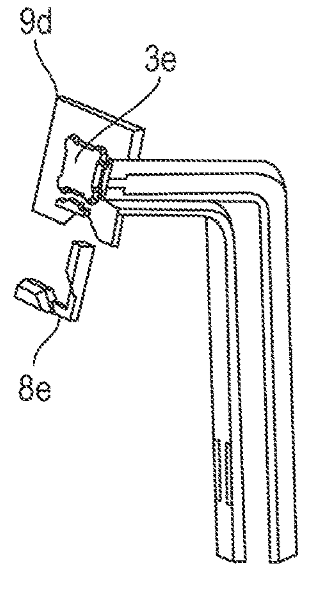
FIG. 7B depicts a different view of an inventive antenna assembly that includes dielectric filler elements according to an embodiment.

FIG. 7B illustrates a single central, rectangular patch antenna element 3*e*, a corresponding, exemplary dielectric filler element 8*e* and dielectric element 9*d*. As shown, the dielectric filler element 8*e* may comprise a single structure, though, alternatively, the single structure may be separated into at least two structures. It should be understood that in embodiments, inventive dielectric filler elements may be configured as (i) a separate piece and assembled to a housing as an individual piece, and/or, (ii) assembled to a dual-pole or single-pole antenna so as to create an antenna sub-assembly that is then assembled to a housing. Yet further, in another embodiment a dielectric filler element may not be required because the geometry of the antenna component and/or housing(s) does not need impedance control (i.e., are configured to control impedance without the need for a filler).

Figure 8:
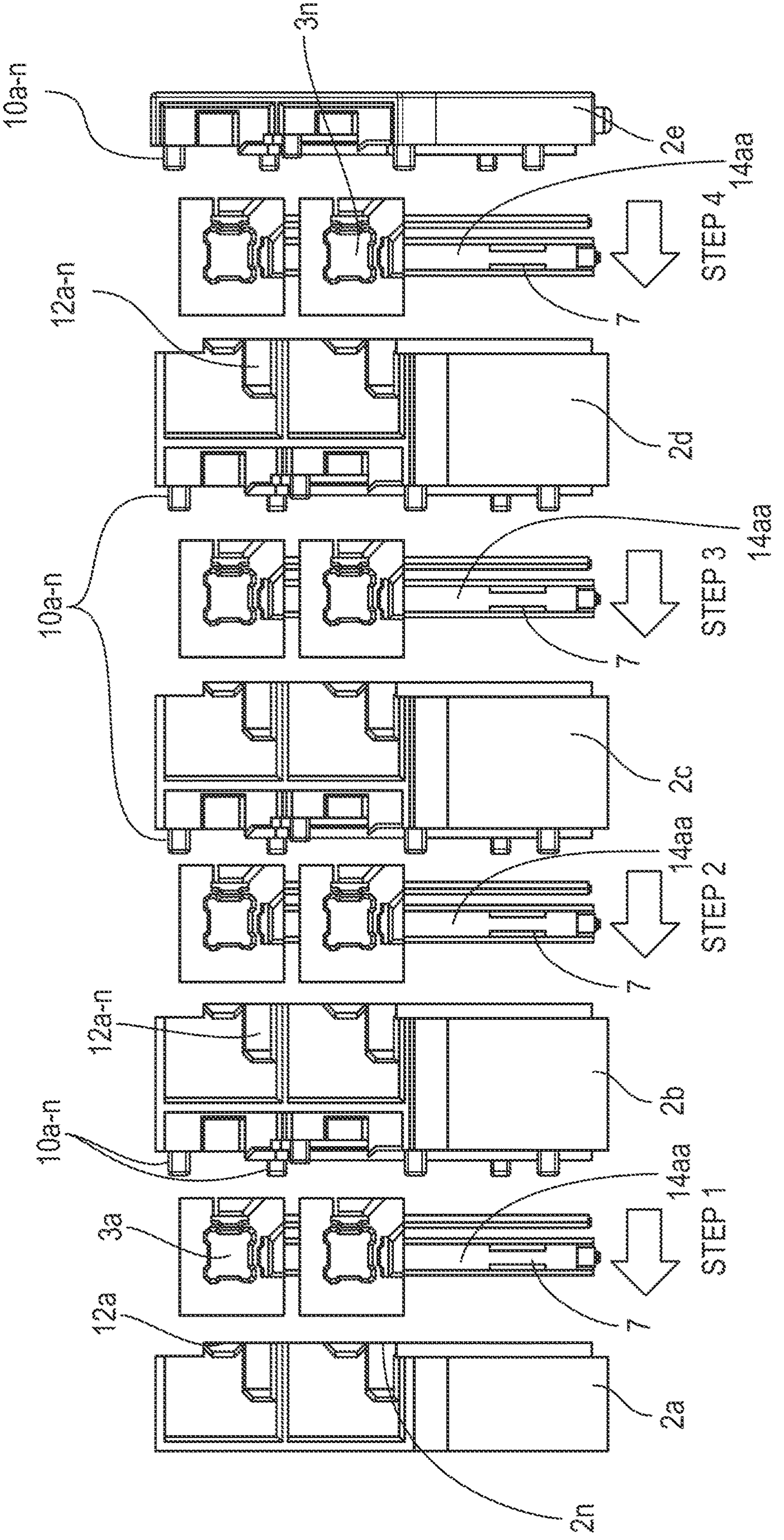
FIG. 8 illustrates exemplary steps that may be used to assemble an inventive antenna assembly according to an embodiment.

Referring now to FIG. 8 there is illustrated exemplary steps that may be used to assemble an inventive antenna assembly, such as assembly 1, according to disclosed embodiments. In FIG. 8, middle housings 2*b* to 2*d* may comprise one or more opposing male and female connecting elements 10*a* to 10*n*, 12*a* to 12*n* (where "n" represents a last male/female element), respectively, where each pair of opposing male and female elements function to connect to one another (i.e., mate) in order to connect each middle housing to either: (i) another middle housing (e.g., 2*c* to 2*b*, 2*d* to 2*c*), (ii) to an end housing 2*a* or (iii) to an end housing tab 2*e*, for example, with the respective antenna elements there between. Further, end housing 2*a* may comprise one or more female elements 12*a* to 12*n*, where each female element functions to connect to a male element 10*a* to 10*n* of a middle housing (e.g., 2*a* to 2*b*) with the respective antenna elements there between, for example, and an end housing tab 2*e* may comprise one or more male connecting elements 10*a* to 10*n*, where each male connecting elements functions to connect to a female connecting element 10*a* to 10*n* of a middle housing (e.g., 2*e* to 2*d*) with the respective antenna elements there between, for example. It should be understood that the male and female connecting elements of an assembly 1 may be reversed and still construct the assembly 1. By constructing the assembly 1, housing section-by-housing section, the assembly 1 can be said to be a modular assembly. That said, it should be understood that the inventive assemblies may also comprise a non-modular configuration (e.g., a uni-body construction).

In an embodiment, each female connecting element 12*a* to *n* may comprise a grooved slot within housing element 2*a* to 2*e* for receiving an opposed, male connecting element 10*a* to 10*n*, where each of the male connecting elements 10*a* to 10*n* may comprise a tab protruding from a surface of a housing element 2*a* to 2*e*. Other structures to assemble the assembly 1—other than the male and female mated connecting elements—may be used as well.

Figure 9:
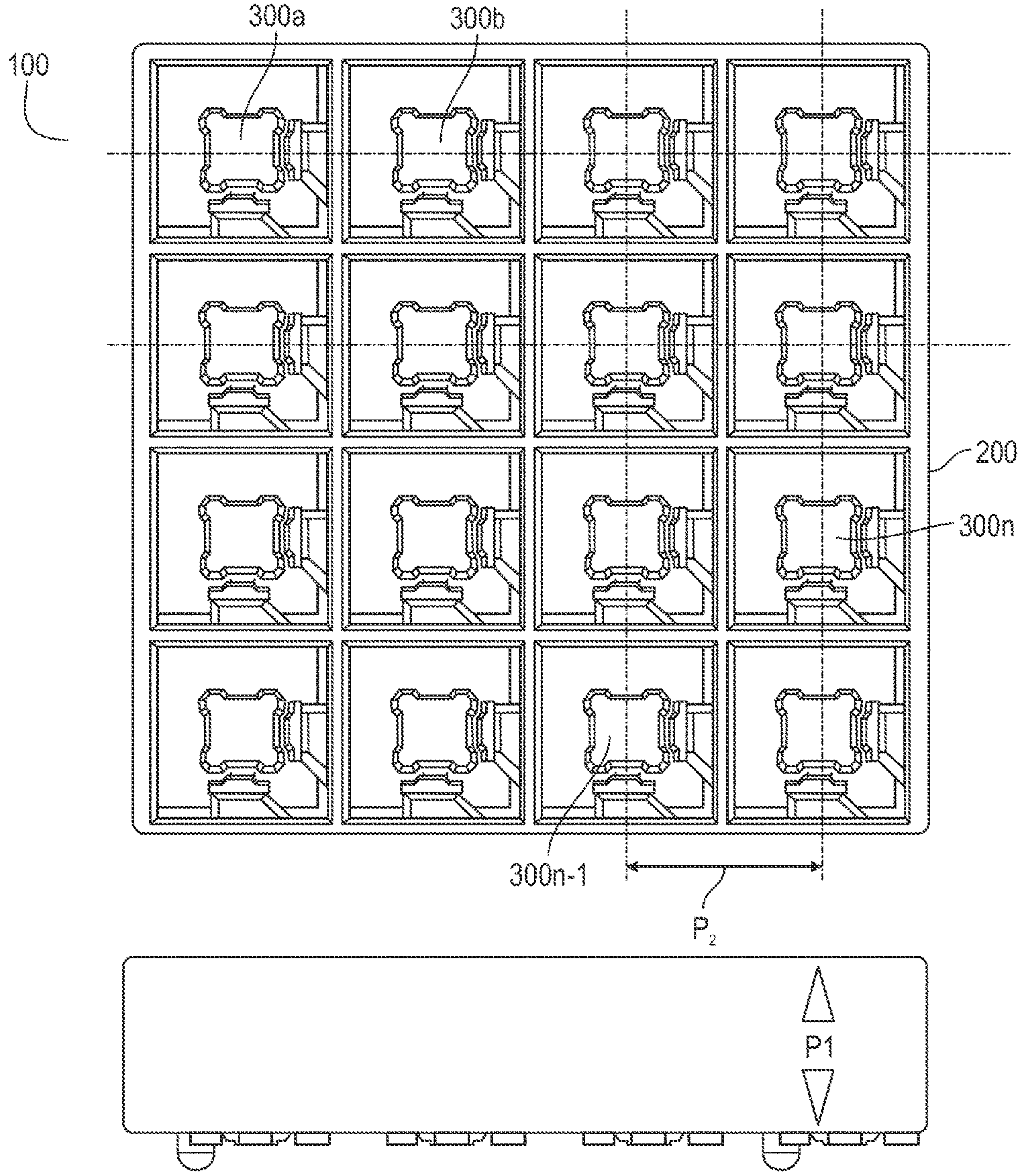
FIG. 9 depicts another embodiment of an exemplary, inventive integrated antenna assembly according to an embodiment.

Referring now to FIG. 9 there is depicted another embodiment of an exemplary, inventive integrated antenna assembly 100 according to an embodiment. As depicted, the assembly 100 may be a combination of rectangular dual pole "patch" antenna elements 300*a* to 300*n* (where "n" indicates a last antenna element; though, as before, a single pole antenna assembly is also within the scope of the present disclosure) that mechanically and electrically connect to telecommunications equipment (not shown; e.g., transmitters, receivers) operating, for example, at millimeter-wave frequencies. Exemplary, non-limiting operating frequency bands are provided above in Table 1. One exemplary application for the inventive antenna assembly 100 is as a wireless radio hub, for example. Notwithstanding such frequency ranges, it should be understood that the exemplary antenna assembly 100 may operate ay frequencies below the ranges above (e.g., below 6000 MHz frequency).

As FIG. 9 depicts, rather than use an orientation angle of 75 degrees, the exemplary antenna assembly 100 may be configured as a zero degree orientation angle (from a vertical axis) assembly.

In an embodiment, in addition to the plurality of dual pole antenna elements 300*a* to 300*n* the assembly 100 may comprise a housing 200 for enclosing and protecting elements 300*a* to 300*n*, among other elements/components, as well as providing a ground reference and establishing a correct spacing/pitch for antenna elements 300*a* to 300*n*. In the embodiment depicted in FIG. 9, the assembly 100 includes sixteen central, rectangular patch antenna elements 300*a* to 300*n* though this is merely exemplary and more, or less, elements may be included in an inventive assembly (e.g., 4, 8, 32, etc.). Further, the exemplary housing 200 is shown comprising a single structure though it should be understood that this is also exemplary and, alternatively, the single housing can be separated into two or more modular housings. In an embodiment, the housing 200 may be composed a dielectric having a dielectric constant and plating that facilitates proper electrical performance along with the correct physical and mechanical properties that facilitate proper mechanical and environmental performance (e.g., an LCP). In an alternative embodiment, the housing may be diecast.

FIG. 9 also depicts exemplary dimensions for the assembly 100. In embodiments, the pitch between elements denoted "P2" (for "pitch) measured from the centerline of one element, 300*n*, to the centerline of another adjacent element 300*n*-1 (i.e., the next to last antenna), may be varied as the desired operating frequency of the elements 300*a* to 300*n* is varied (e.g., the pitch between a patch antenna operating at 24250 MHz is different than the pitch between a patch antenna operating at 37000 MHz).

Figure 10A:
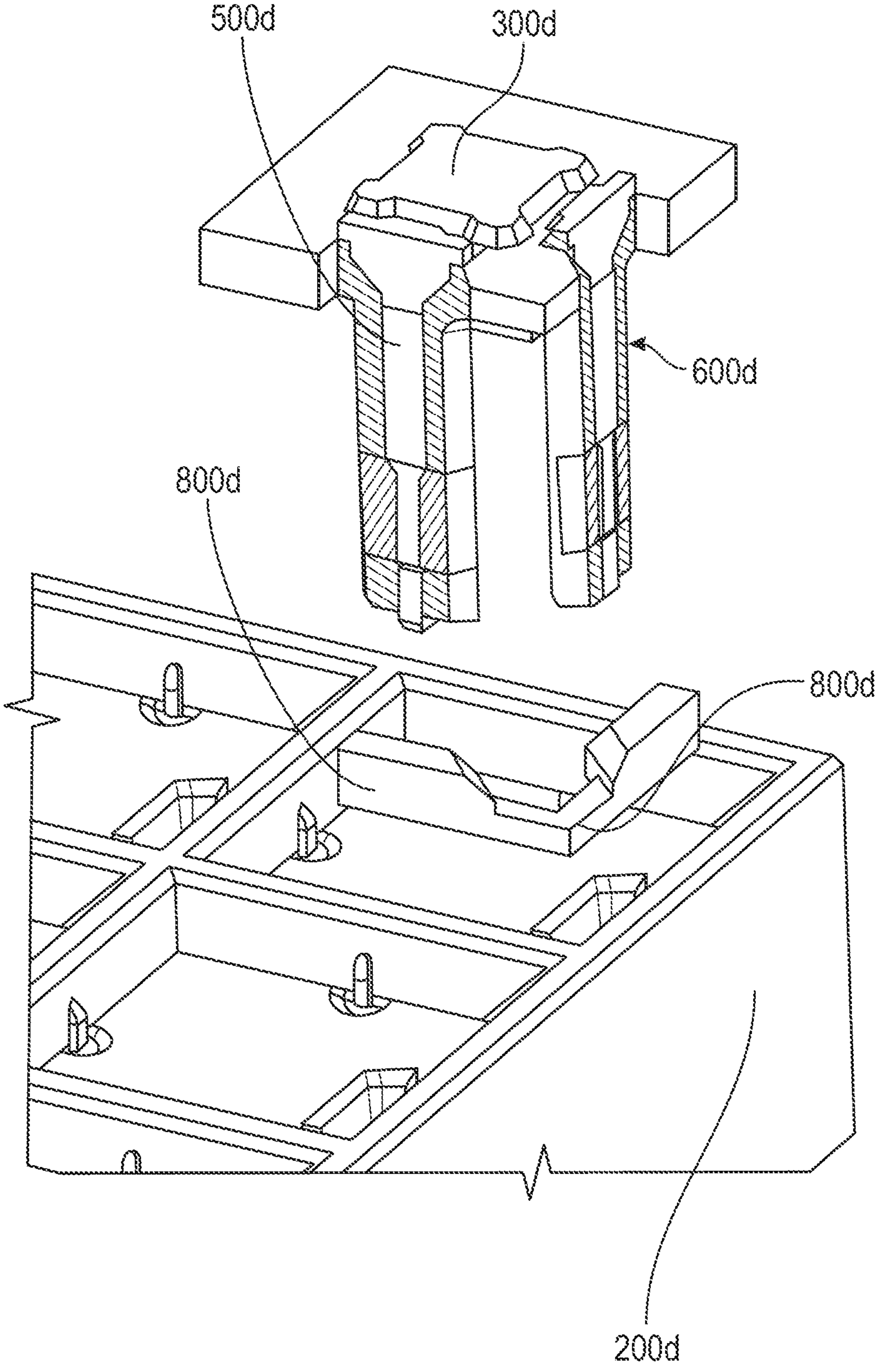
FIG. 10A depicts an illustrative view of a single antenna separated from its housing for ease of explanation according to an embodiment.

FIG. 10A depicts an illustrative view of a single element 300*d* separated from its housing 200 for ease of explanation. In an embodiment, each patch element 300*a* to 300*n* may be capacitively coupled or directly attached to poles 500*a* to 500*n*, 600*a* to 600*n*. For example, patch element of 300*d* may be capacitively coupled to poles 500*d*, 600*d*, where it is understood that in this dual-pole embodiment one pole allows an exemplary patch antenna to transmit or receive electromagnetic signals, at certain frequencies, that are polarized along one linear axis (e.g., x-axis) and the other pole allows the patch antenna to transmit or receive electromagnetic signals that are polarized along another orthogonal linear axis (e.g., y-axis)(i.e., the relative orthogonal orientation of each individual pole within each pair is representative of a dual-pole patch antenna configuration.

Figure 10B:
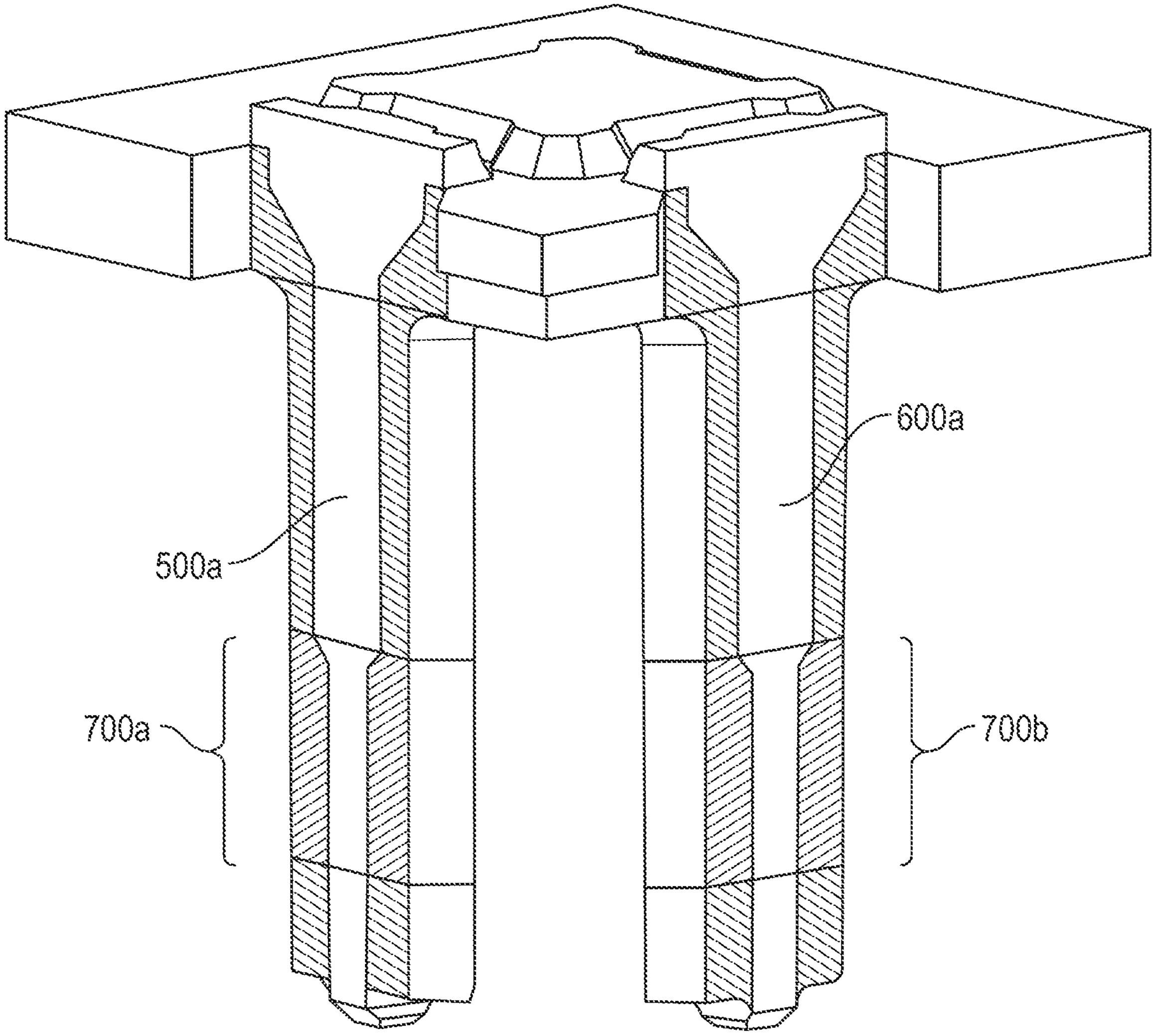
FIG. 10B depicts an anti-wicking feature of poles of an antenna element according to an embodiment.

Referring now to FIG. 10B, it should be understood that each pole 500*a* to 500*n*, 600*a* to 600*n* may comprise a tuning section 700*a* to 700*n* (only two are shown in FIG. 10B, 700*a*, 700*b*) that functions to affect the electromagnetic properties of each pole 500*a* to 500*n*, 600*a* to 600*n*. In an embodiment, each tuning section 700*a* to 700*n* may comprise a "dog bone" shaped section that functions to affect the electromagnetic properties of each dipole (e.g., the longer the "dog bone" section, the more of an effect on a dipole; see sections 7 in FIG. 8). In this manner electromagnetic properties of a single or dual pole antenna element may be controlled in order to achieve a desired set of design criteria (e.g., maximize return loss (minimize reflections) of pole transmission lines for optimum overall performance).

Further, FIG. 10B also illustrates additional features of an inventive assembly. For example, each tuning section 700*a* to 700*n* (only two are shown 700*a, b*) may be formed as a multi-layer section, where an exemplary conductive layer (e.g., gold) may be formed over an exemplary diffusion barrier layer (e.g., nickel). In an embodiment, the conductive layer may be removed or stripped in a post-plating process (or never added initially) by a laser, for example. As a result, the diffusion barrier layer of each tuning section will be exposed to the atmosphere allowing oxides to form on the exposed layer. Such a stripped section of the pole may be referred to as an "anti-wicking" section because the oxides prevent solder from being drawn up the pole ("wicked up") from a soldering joint during a reflow soldering process used to connect the poles to a substrate (e.g. printed wiring board). Because solder cannot be drawn up, it remains near the solder joint. This improves the reliability of the solder joint. Said another way, when oxides are not formed (when the conductive layer is not stripped away) solder may be drawn up or "wicked up" the pole away from the joint, resulting in less solder remaining at the solder joint and leading to a weakened joint (i.e., decreased reliability of the solder joint).

Yet further, if solder is allowed to be drawn up a pole (if no anti-wicking section is present), the solder may not be uniformly distributed over the portion of the pole where it is flowing or has flowed. Such a non-uniform distribution may negatively impact the electrical performance (return loss, dielectric withstanding voltage) of a pole, and, thus, an inventive assembly. Conversely, the incorporation of anti-wicking sections into a pole removes the issue of the non-uniform distribution of solder and improves electrical performance because substantially no solder is allowed to flow up a pole.

Figure 10C:
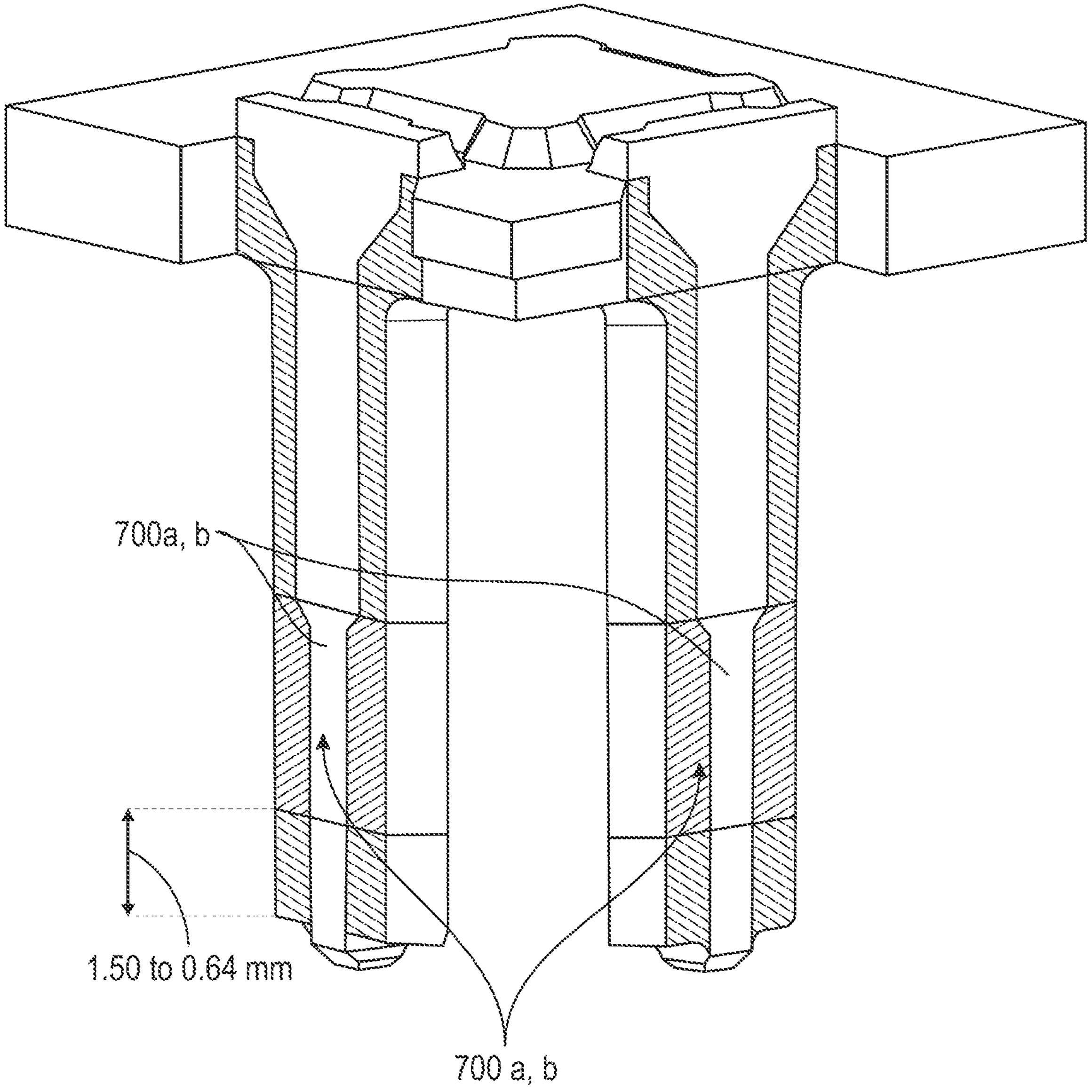
FIG. 10C depicts an anti-wicking feature of poles of an antenna element according to an embodiment.

Exemplary, non-limiting dimensions of anti-wick tuning sections 700*a*, 700*b* are also shown in FIG. 10C.

Figure 10D:
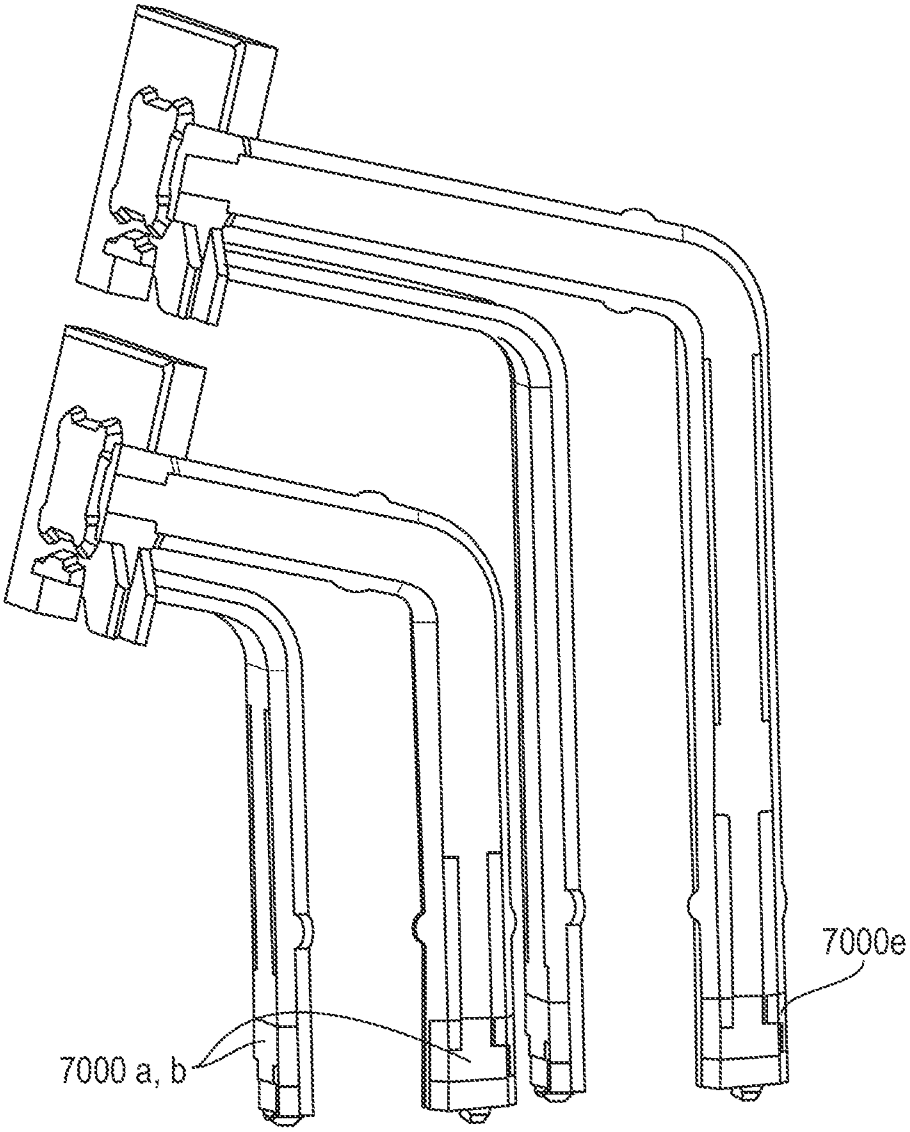
FIG. 10D depicts an anti-wicking feature of poles of an antenna element according to an embodiment.

While FIGS. 10A to 10C depict anti-wicking features of an antenna assembly having a 0 degree orientation angle, it should be understood that anti-wicking features may also be incorporated into assemblies that have different orientation angles other than 0 degrees. For example, FIG. 10D depicts anti-wicking, tuning sections number 7000, 700*b* and 7000*c* for an antenna assembly having an orientation angle of 75 degrees, for example (see earlier figures, e.g., FIG. 6).

Each pair of poles 500*a* to 500*n*, 600*a* to 600*n* may be associated with at least one, corresponding dielectric filler element 800*a* to 800*n* (where "n" connotes the last element), it being understood that in a single-pole embodiment a single-pole is associated with a corresponding dielectric filler element. In FIG. 10A there is shown poles 500*d*,600*d* and at least one dielectric filler element 800*d*, respectively, it being understood that at least one respective dielectric filler element 800*a* to 800*n* is associated with each pole 500*a* to 500*n*, 600*a* to 600*n* though these are not shown in FIG. 9 or 10A.

In an embodiment, each dielectric filler element 800*a* to 800*n* associated with each pole of an antenna element may function to fill an air gap so as to control the impedance of individual poles, and may be composed of material consisting of a dielectric constant that functions to provide the correct physical and mechanical properties that facilitate a desired electrical, mechanical and environmental performance (e.g., an LCP an example of which is made by the Celanese Corporation, Model LKX1761, Zenite LCP).

Though the dielectric filler element 800*d* is depicted as a single structure, alternatively, the single structure may be separated into at least two structures. As previously stated, it should be understood that in embodiments, inventive dielectric filler elements may be configured as (i) a separate piece and assembled to a housing as an individual piece, and/or, (ii) assembled to an antenna so as to create an antenna sub-assembly that is then assembled to a housing. Yet further, in another embodiment a dielectric filler element may not be required because the geometry of the antenna component and/or housing(s) does not need impedance control (i.e., are configured to control impedance without the need for a filler).

Figure 11:
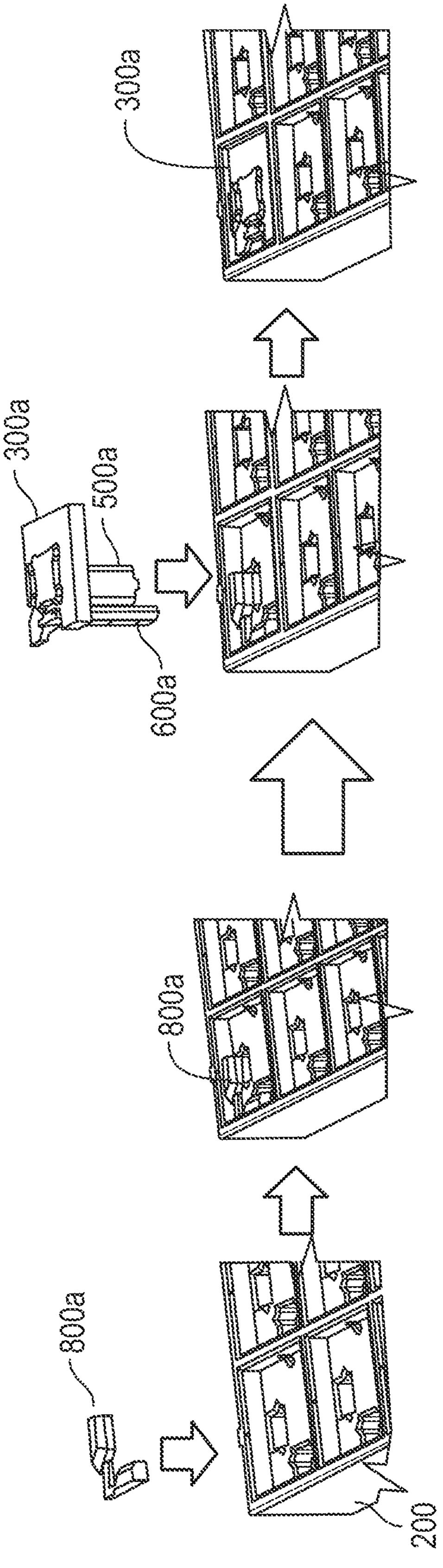
FIG. 11 illustrates exemplary steps that may be used to assemble the inventive antenna assembly shown in FIG. 9 according to an embodiment.

Referring now to FIG. 11 there is illustrated exemplary, simplified steps that may be used to assemble an inventive antenna assembly, such as assembly 100, according to embodiments. In a simplified embodiment, a dielectric filler element 800*a* may be first positioned into a corner of the housing 200. Thereafter, the antenna element 300*a* with poles 500*a*, 600*a* may be positioned in the housing 200 to form part of an assembly 100 (or, if there is only a single element, then the entire assembly 100).

Figure 12A:
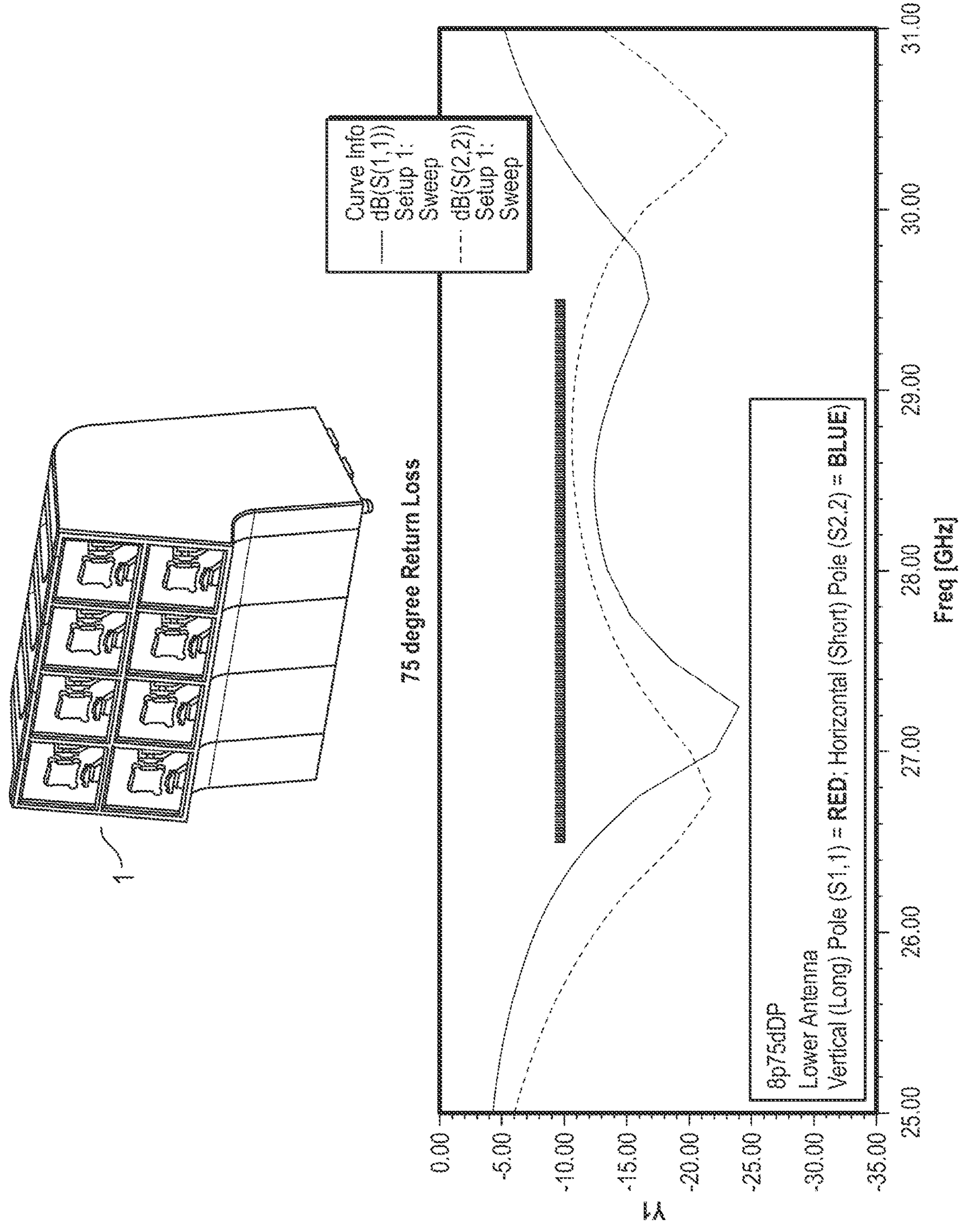
FIG. 12A illustrates exemplary simulated measurements of the return loss for an antenna assembly according to an embodiment.
Figure 12B:
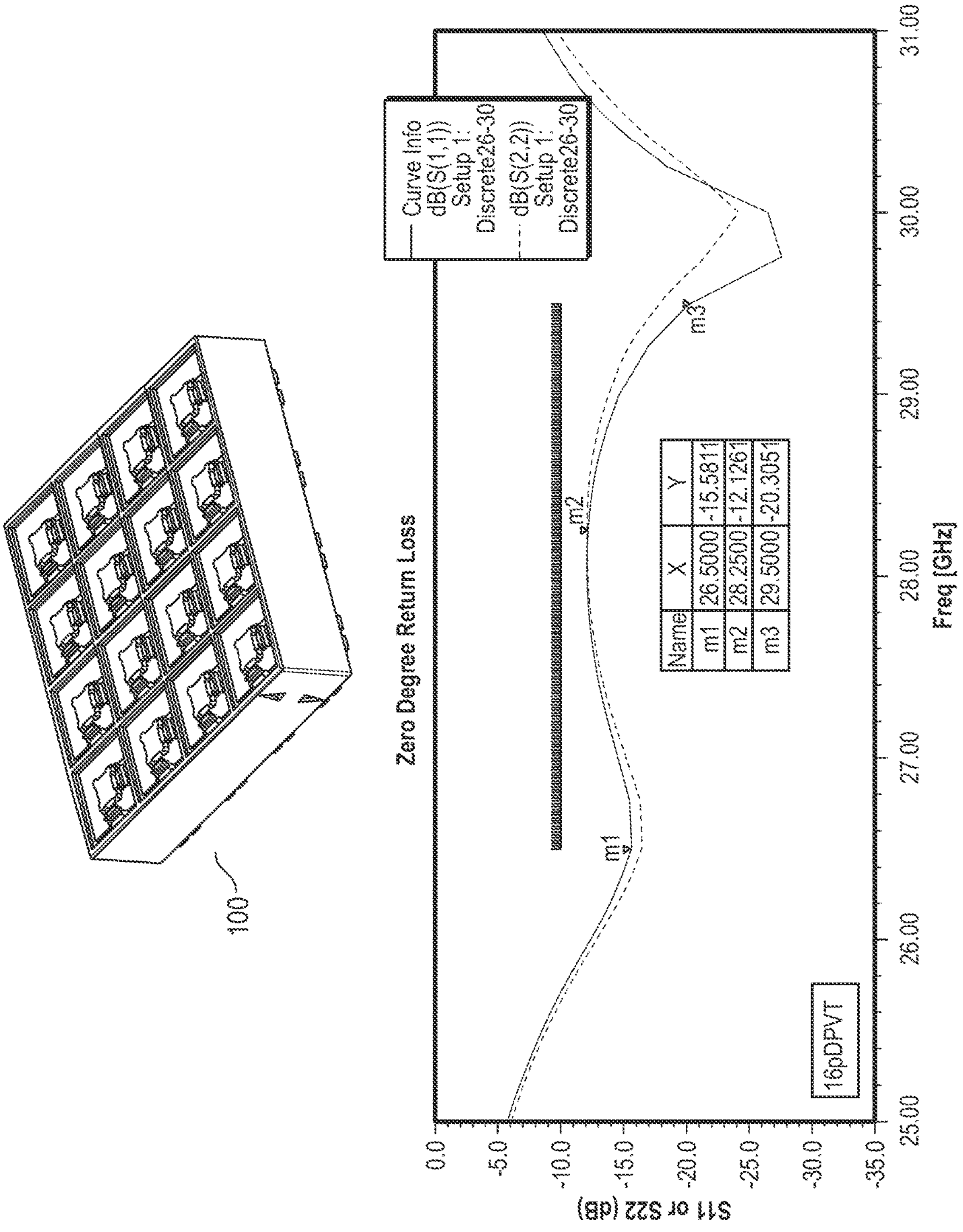
FIG. 12B illustrates exemplary simulated measurements of the return loss for an antenna assembly according to an embodiment.
Figure 13A:
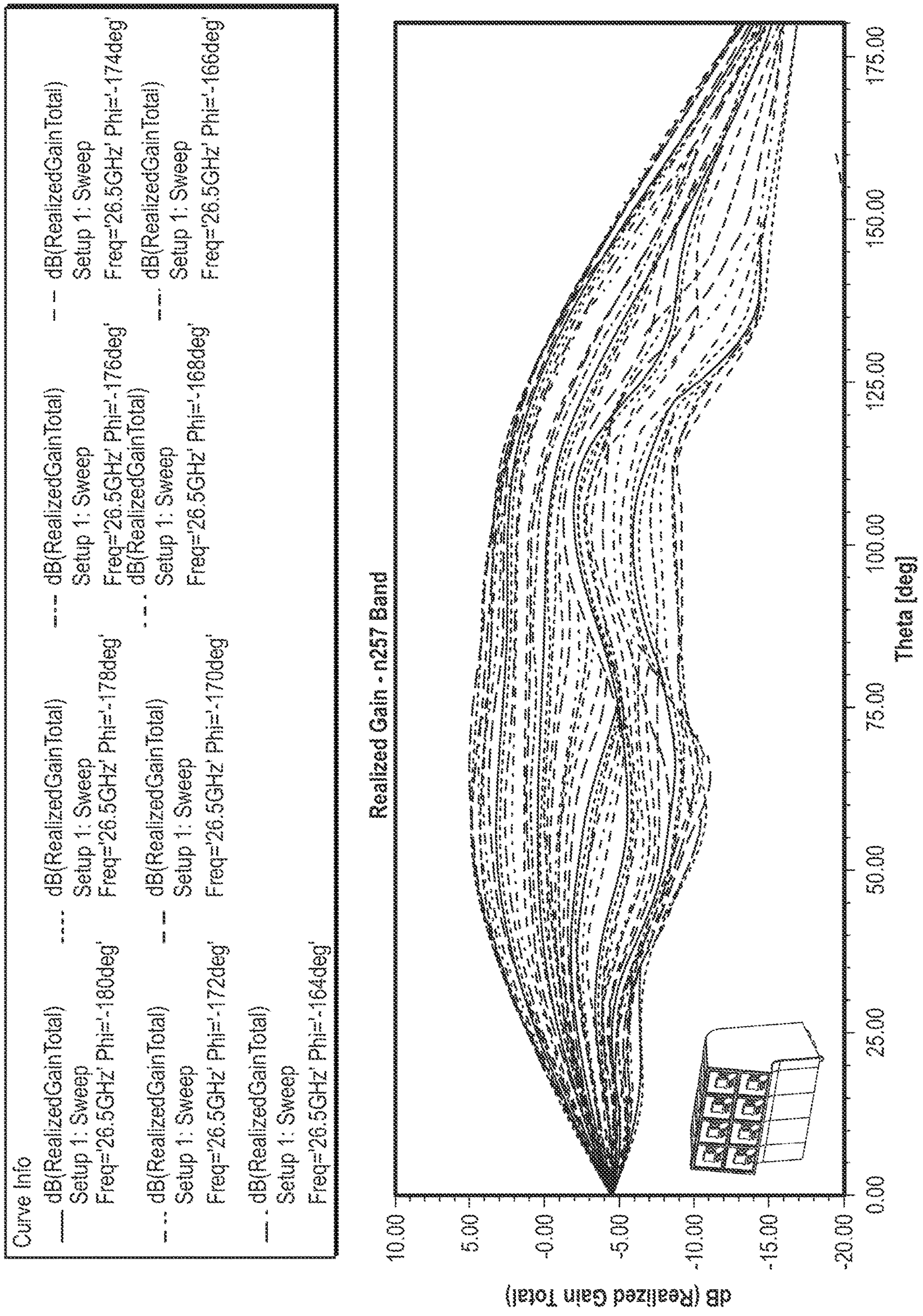
FIG. 13A illustrates exemplary simulated measurements of gain for an antenna assembly according to an embodiment.
Figure 13B:
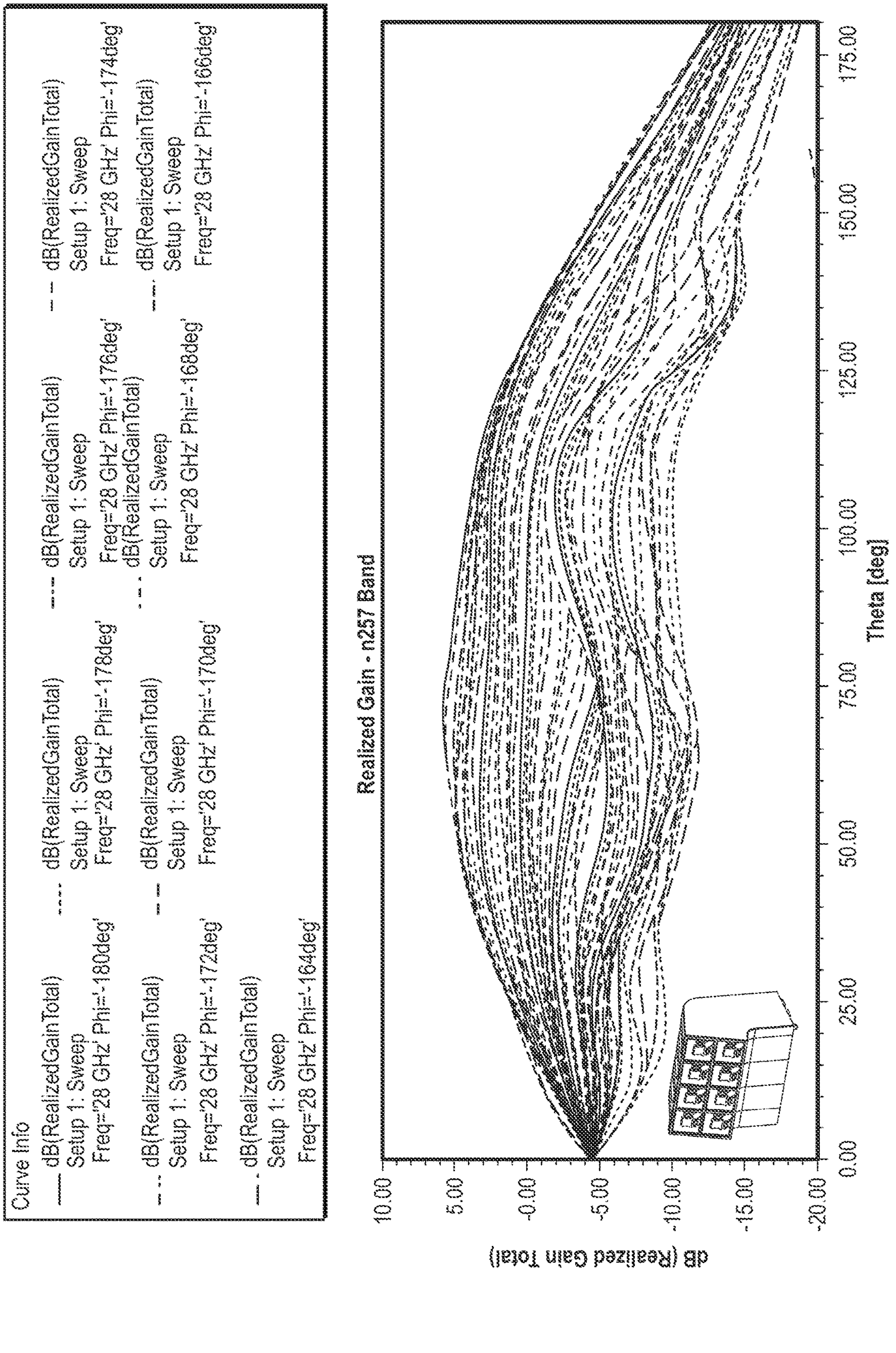
FIG. 13B provides exemplary simulated measurements of gain for an antenna assembly according to an embodiment.
Figure 13C:
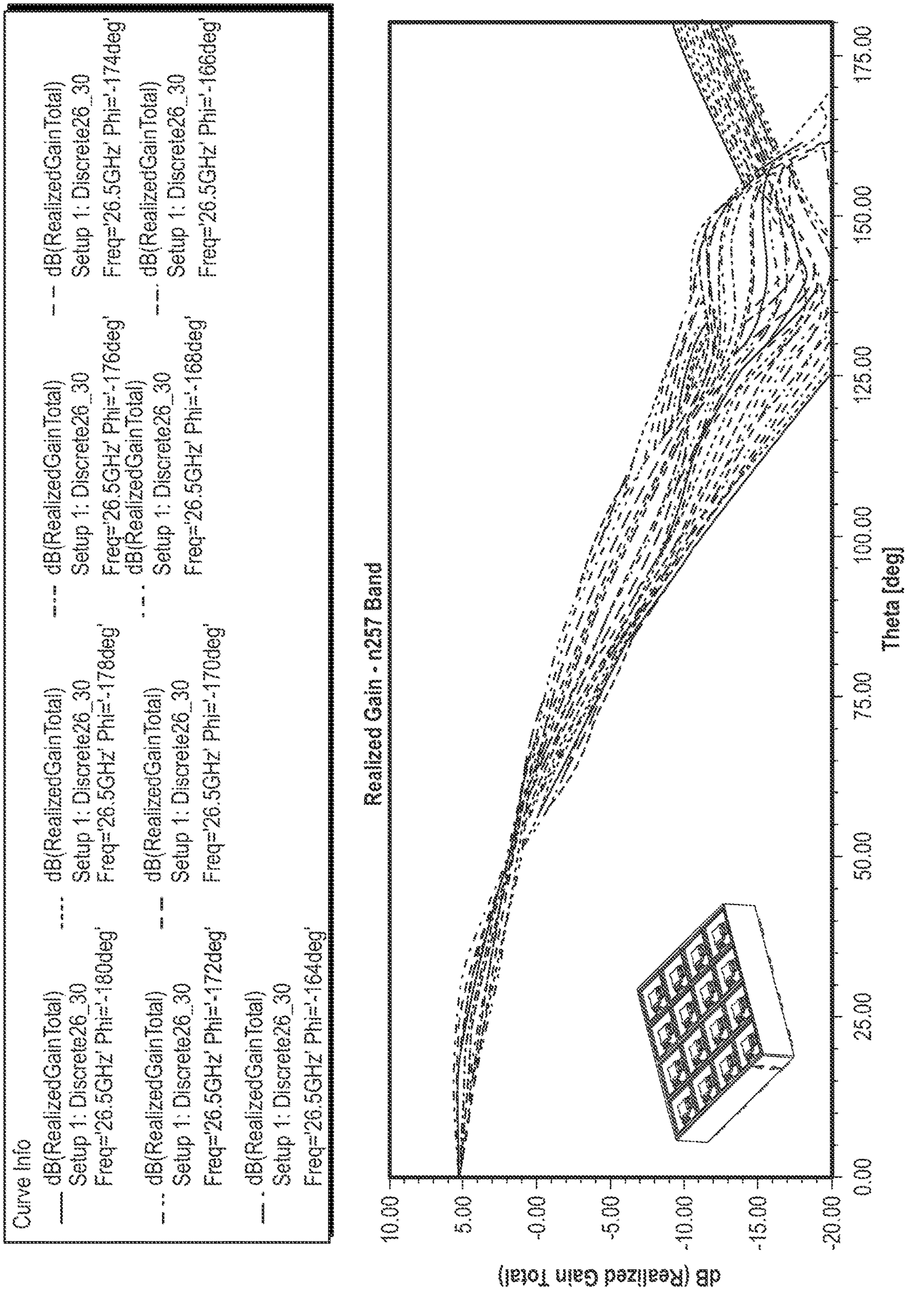
FIG. 13C illustrates exemplary simulated measurements of gain for an antenna assembly according to an embodiment.
Figure 13D:
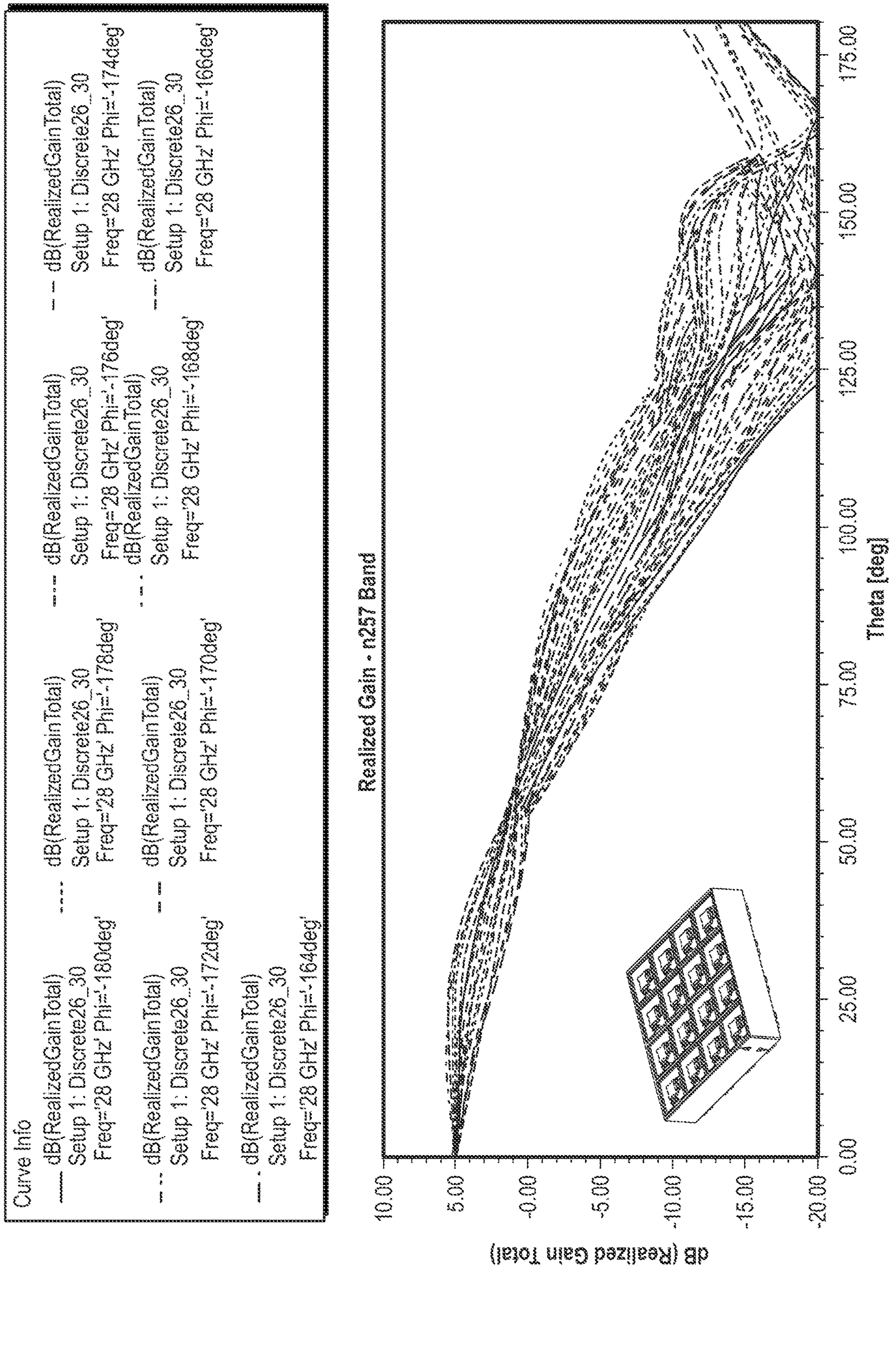
FIG. 13D illustrates exemplary simulated measurements of gain for an antenna assembly according to an embodiment.
Figure 14A:
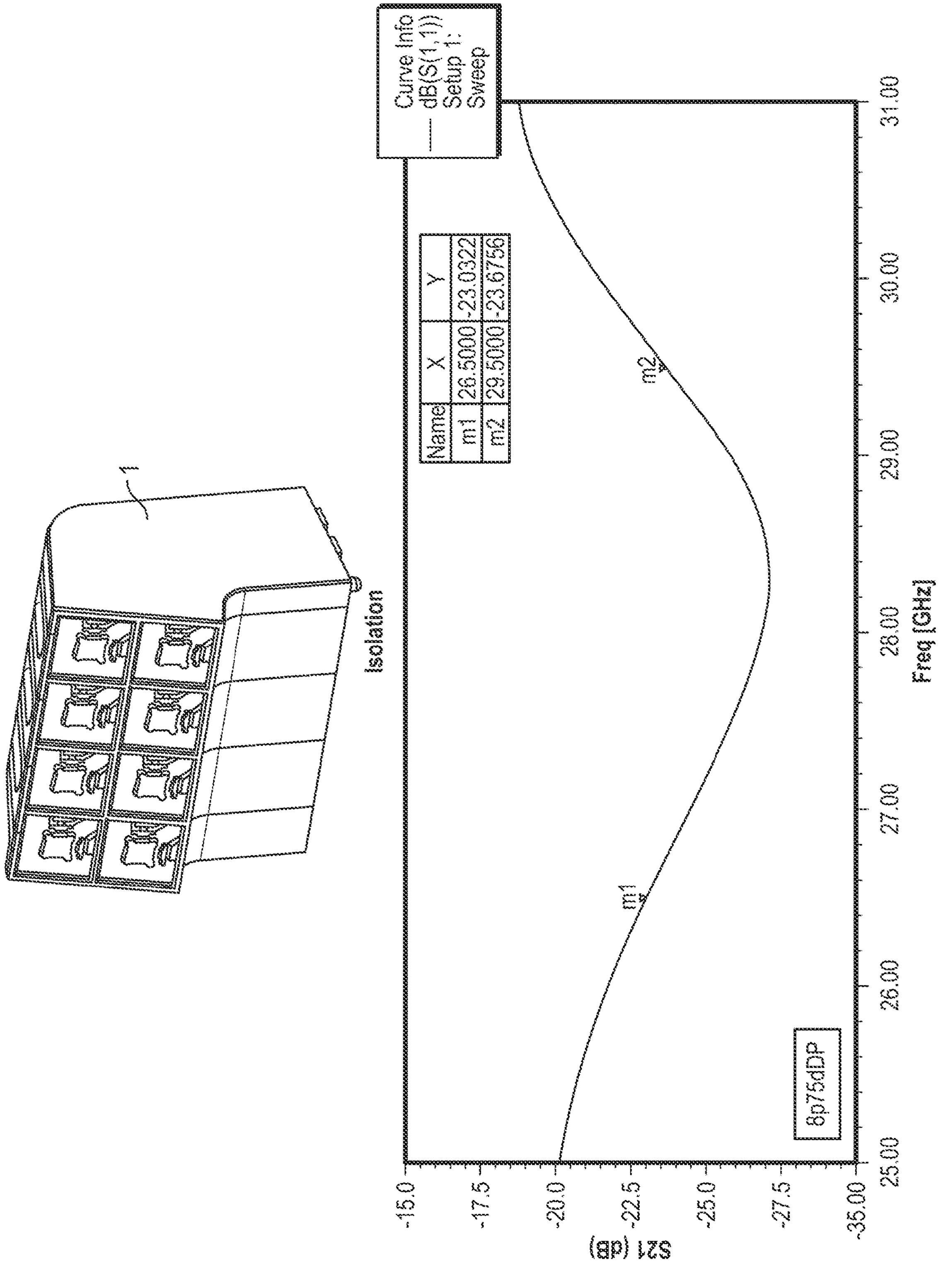
FIG. 14A illustrates exemplary simulated isolation measurements for an antenna assembly according to an embodiment.
Figure 14B:
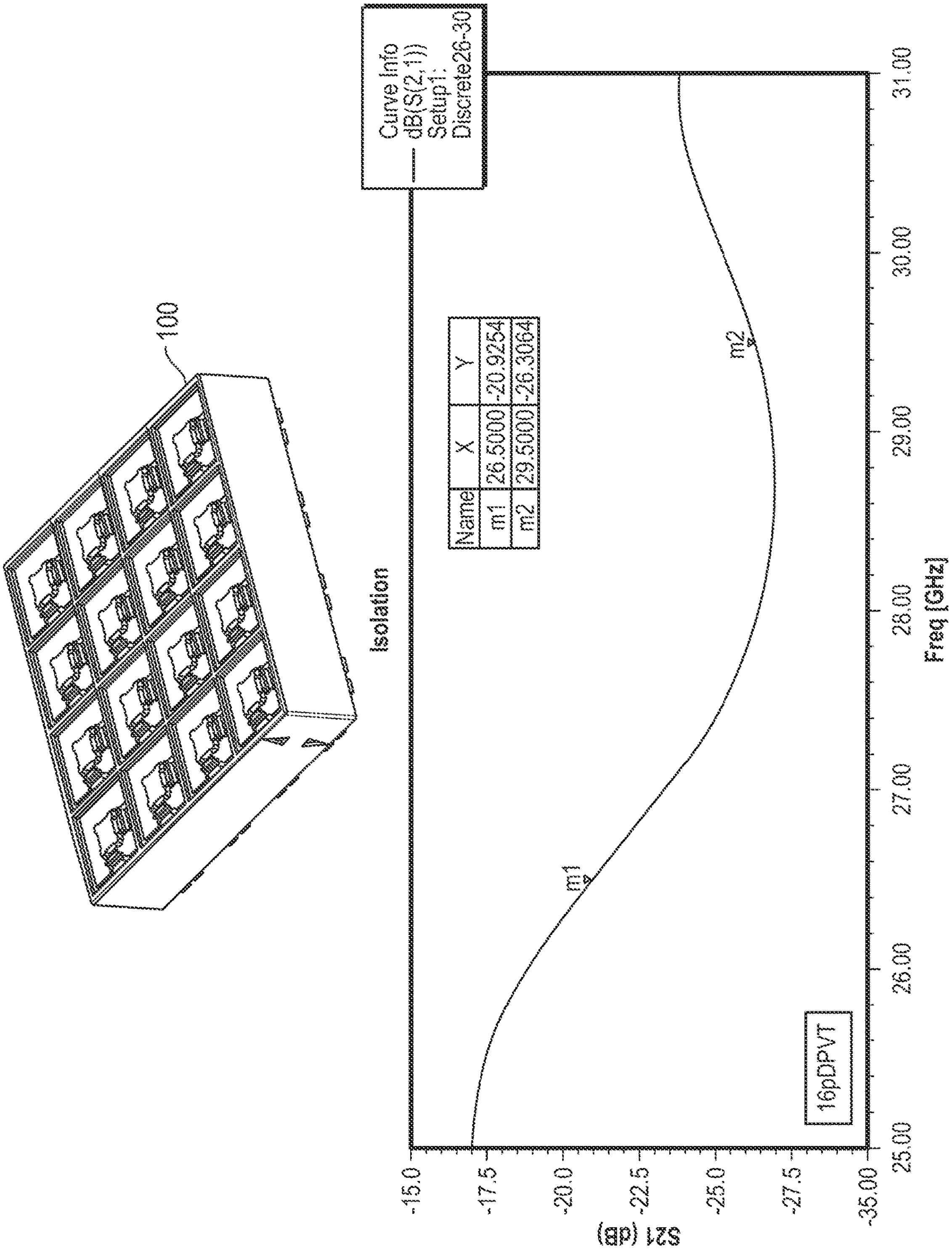
FIG. 14B illustrates exemplary simulated isolation measurements for an antenna assembly according to an embodiment.

FIGS. 12A, B, 13A to D and 14A, B provide exemplary graphs of simulated measurements of the return loss, gain, and single element pole-to-pole isolation for inventive antenna assemblies similar to assemblies 1 and 100, respectively. In more detail, in FIG. 12A the return loss for a 75-degree orientation using antenna elements making up a four-antenna linear array (lower antenna) is shown while in FIG. 12B the return loss for a 0-degree orientation is. In FIGS. 13A and 13B, the gain at two different frequencies for a 75-degree orientation using antenna elements making up a four antenna linear array (lower antenna) is shown while in FIGS. 13C and 13D the gain at two different frequencies for a 0-degree orientation is shown. In FIG. 14A the isolation measurement for a 75-degree orientation using antenna elements making up a four-antenna linear array (lower antenna) is shown while in FIG. 14B the isolation measurement for a 0-degree orientation is shown.

Figure 15A:
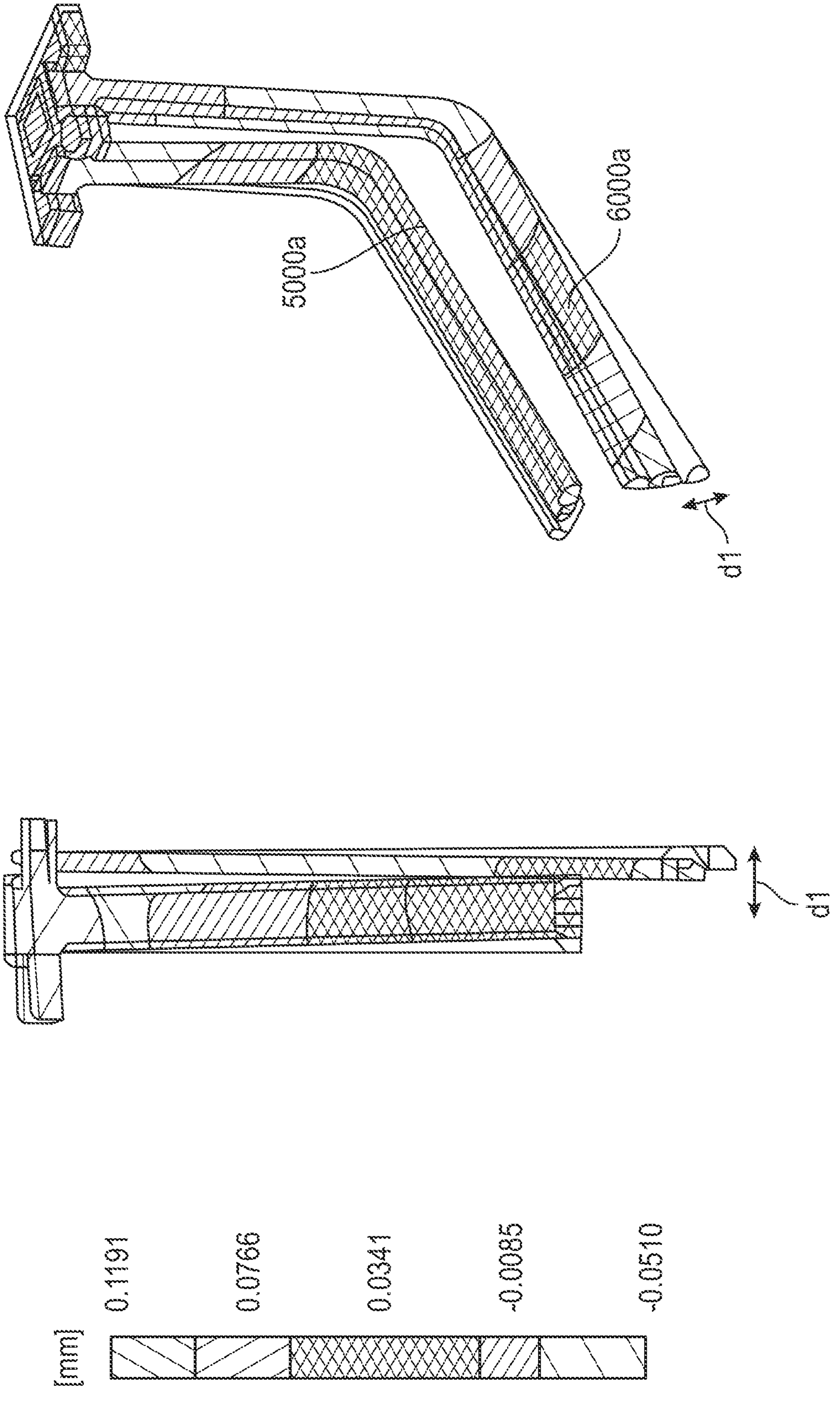
FIG. 15A illustrates undesired warping or mis-shaping of a pole of an antenna element.

Referring now to FIG. 15A there are depicted exemplary poles 5000*a*, 6000*a* of an antenna assembly (e.g., a 75 degree orientation angle assembly). During formation of a poles 5000*a*, 6000*a* the end of a pole may become deformed or mis-shaped (collectively "mis-shaped") by a distance d1, for example. If this occurs, the desired electrical properties of the poles 5000*a*, 6000*a*, and therefore their associated assembly, may become degraded (e.g., expected return loss, impedance and dielectric withstanding voltage may not be met).

In experiments, the inventors have discovered that the dimensions of a 75 degree orientation pole should be controlled such that the end does not warp or otherwise become mis-shaped by more than 0.50 mm (0.020 inches; i.e., d1 is less than 0.50 mm) to avoid undesirable degradation of the electrical properties of the poles 5000*a*, 6000*a* and assembly.

Figure 15B:
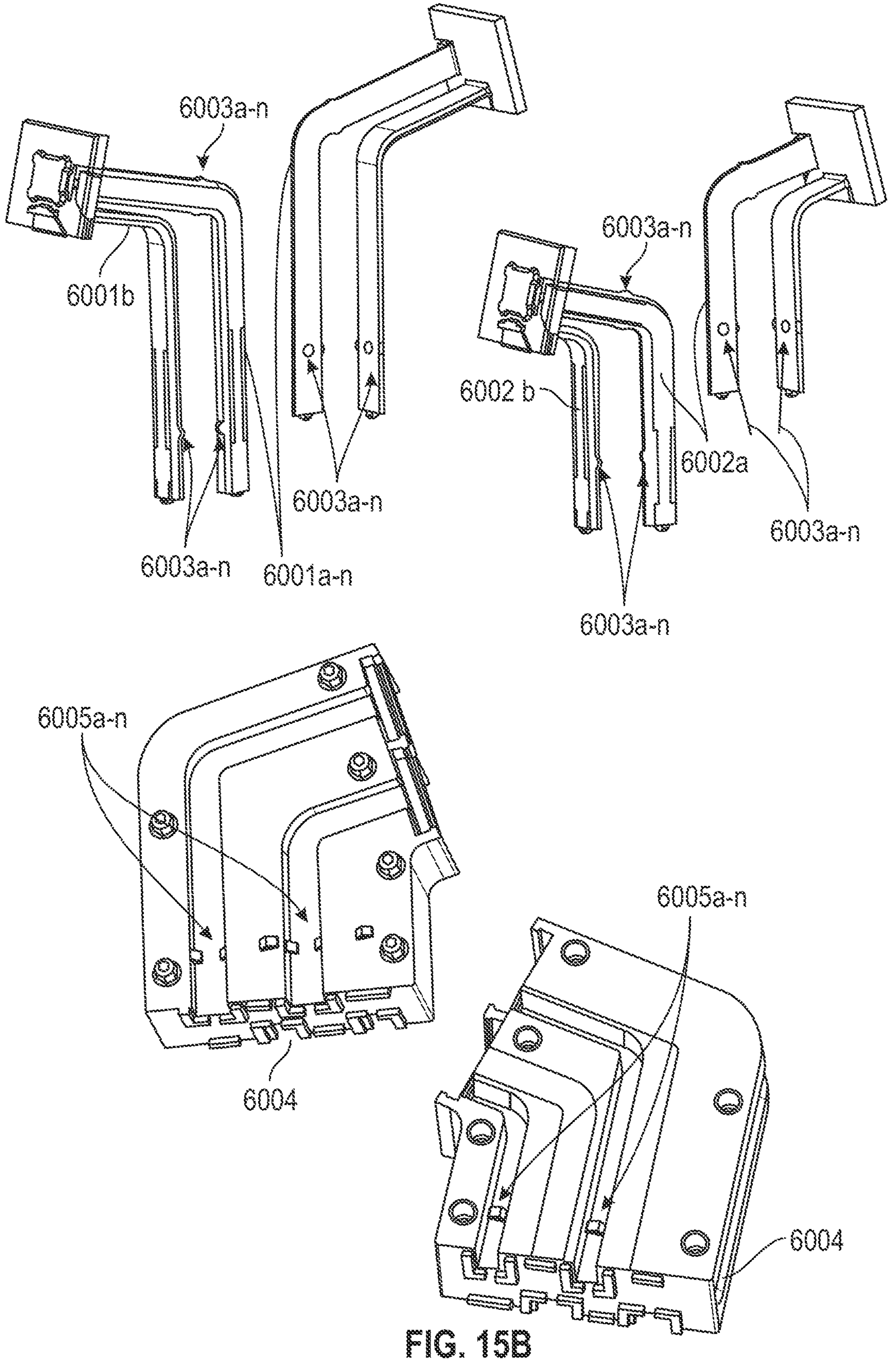
FIG. 15B depicts an exemplary, inventive solution to warping and mis-shaping according to embodiments.
Figure 15C:
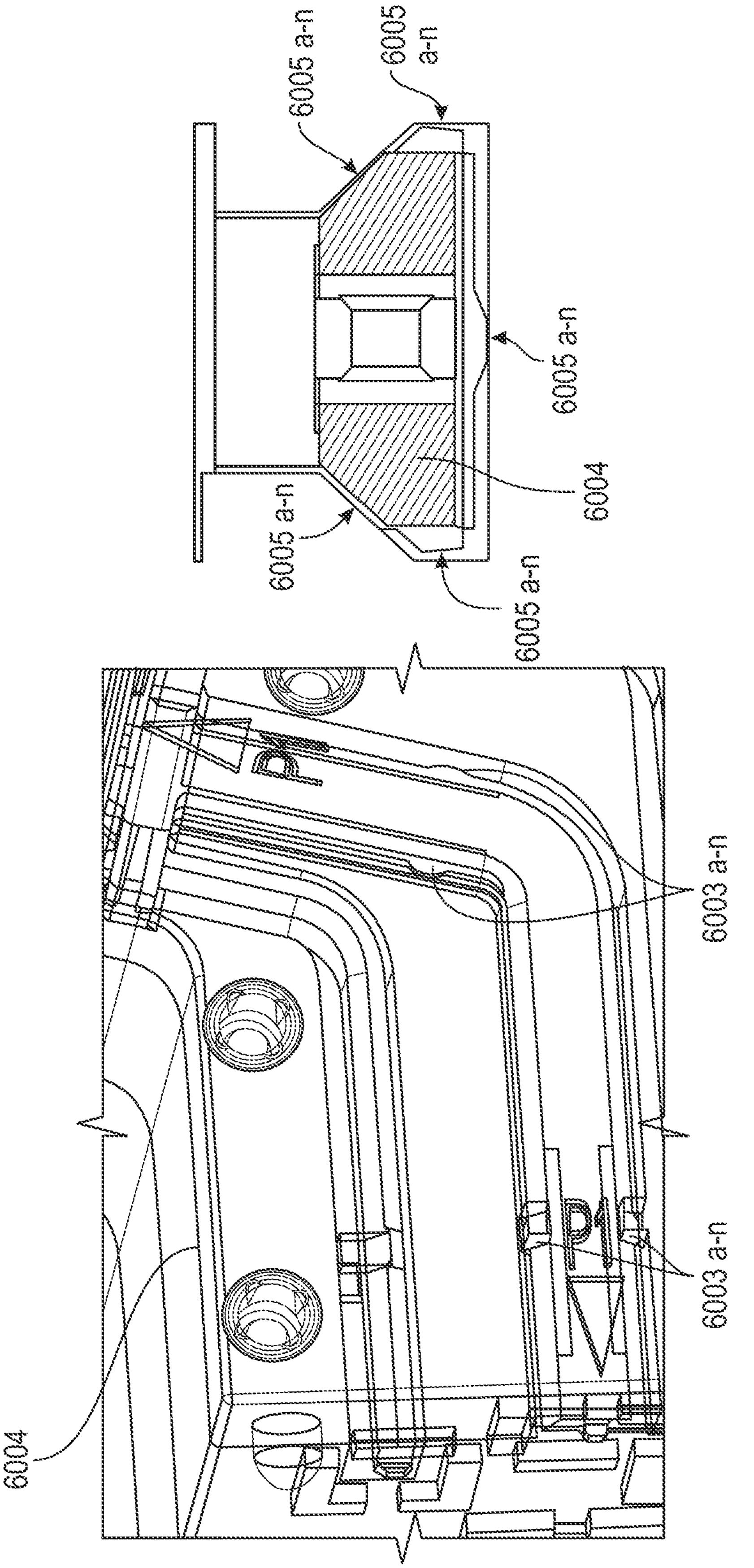
FIG. 15C depicts another exemplary, inventive solution to warping and mis-shaping according to embodiments.

Accordingly, the inventors provide solutions to control the dimensions of an end of a pole. Referring to FIGS. 15B and 15C, in one embodiment such undesirable effects may be minimized by incorporating alignment structures into an assembly. For example, each pole 6001 *a,b* and 6002 *a,b* may include one or more alignment structures (e.g., biasing bumps) 6003*a* to 6003*n*. Alternatively or additionally, a housing 6004 may incorporate one or more alignment structures (e.g., biasing blocks) 6005 to 6005*n* (see FIGS. 15B and 15C). The inventors discovered that by incorporating the alignment structures the shape of a pole could be controlled (e.g., a pole could be centered in a cavity of the housing) in order to avoid undesirable electrical effects (e.g., the impedance could be controlled and, thus, so could return loss.

Figure 15D:
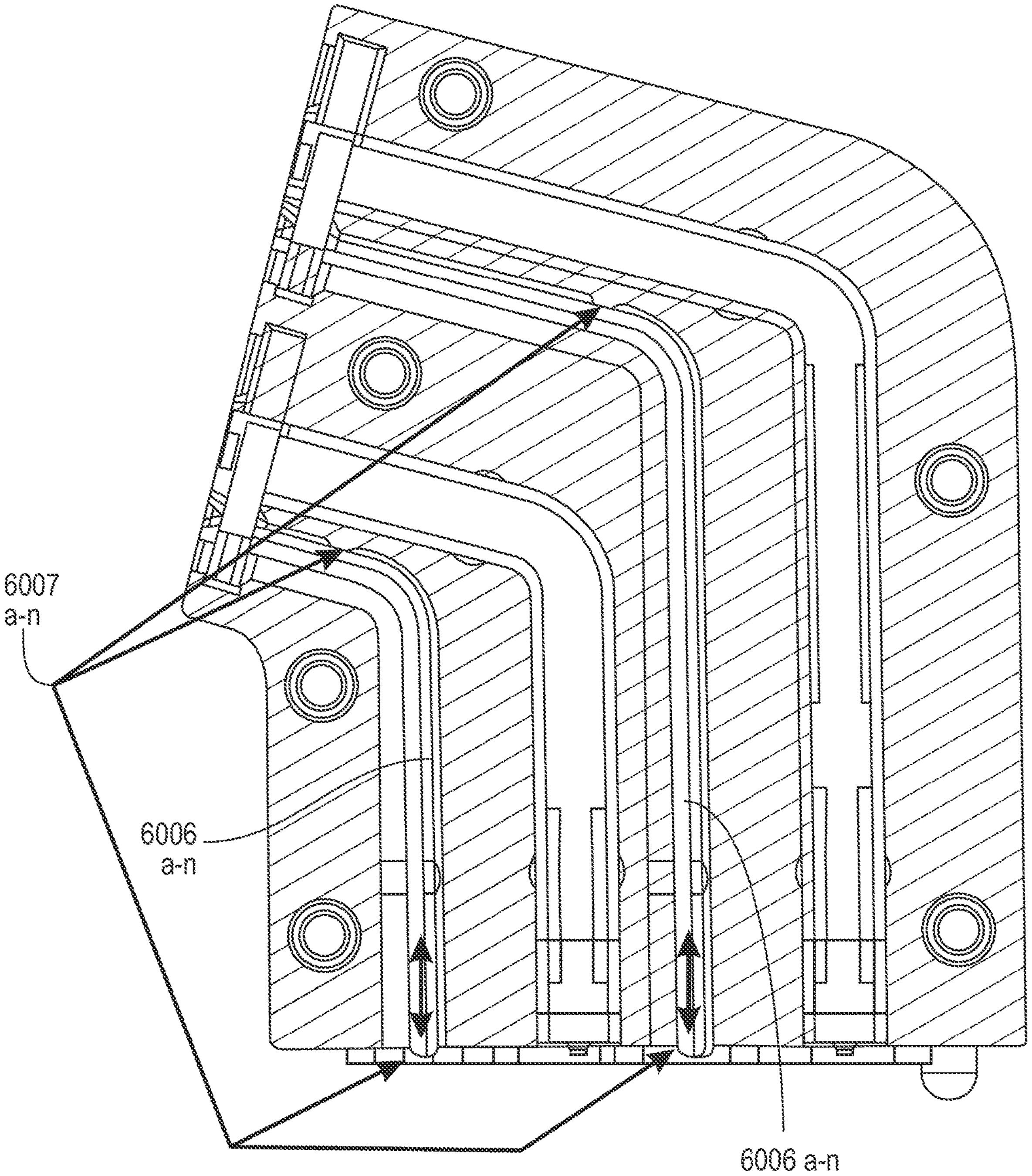
FIG. 15D depicts exemplary alignment structures according to embodiments.

Still further, referring to FIG. 15D, in embodiments one or more short poles 6006*a* to 6006*n* may be configured with one or more alignment structures (e.g., biasing bumps) 6007*a* to 6007*n* to limit the position (e.g., vertically up and down) of a short pole (or poles) with respect to standoffs of a printed circuit board (not shown in figure). This may be referred to as controlling SMT co-planarity.

Figure 16A:
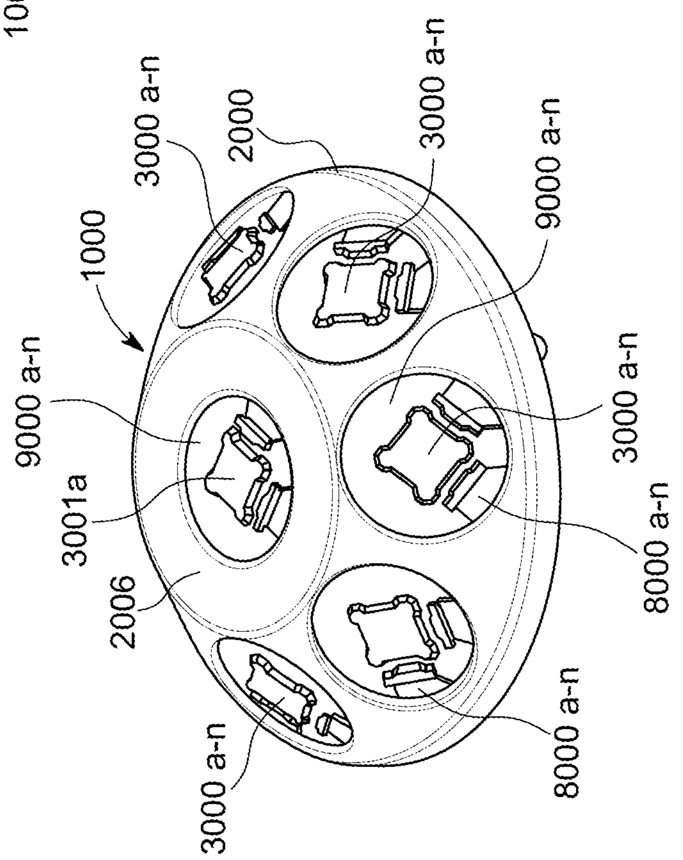
FIG. 16A depicts yet another exemplary, inventive integrated antenna assembly according to an embodiment.

Referring now to FIG. 16A there is depicted yet another embodiment of an exemplary, inventive integrated antenna assembly 1000. As depicted, the assembly 1000 may comprise a plurality of dual pole antenna elements 3000*a* to 3000*n*, and 3001*a* (where "n" indicates a last antenna element; though, as before, a single pole antenna assembly is also within the scope of the disclosure) that mechanically and electrically connect to telecommunications equipment (not shown; e.g., transmitters, receivers) operating, for example, at millimeter-wave frequencies. Exemplary, non-limiting operating frequency bands are provided above in Table 1. One exemplary application for the inventive antenna assembly 1000 is as a wireless radio hub, for example. Notwithstanding such frequency ranges, it should be understood that the exemplary antenna assembly 1000 may operate at frequencies below the ranges above (e.g., below 6000 MHz frequency).

As FIG. 16A depicts, the exemplary antenna assembly 1000 may comprise a plurality of antenna elements 3000*a* to 3000*n* configured at a 45 degree orientation angle (e.g., seven) from a vertical axis and at least one antenna element 3001*a* configured at zero degree, orientation angle. In the embodiment depicted in FIG. 16A, the assembly 1000 includes eight antenna elements 3000*a* to 3000*n*, 3001*a* though this is merely exemplary and more, or less, elements may be included in an inventive assembly (e.g., 4, 16, 32, etc. . . . ). Though one element 3001*a* is shown at a zero degree orientation angle this is also merely exemplary (i.e., more than one can be included in assembly 1000 or no element may be included, see for example FIGS. 20A to 20C and 21A to 21C). Similarly, though seven elements 3000*a* to 3000*n* are shown at a 45 degree orientation angle this is merely exemplary as well (more or less than seven can be included in an assembly).

Figure 16B:
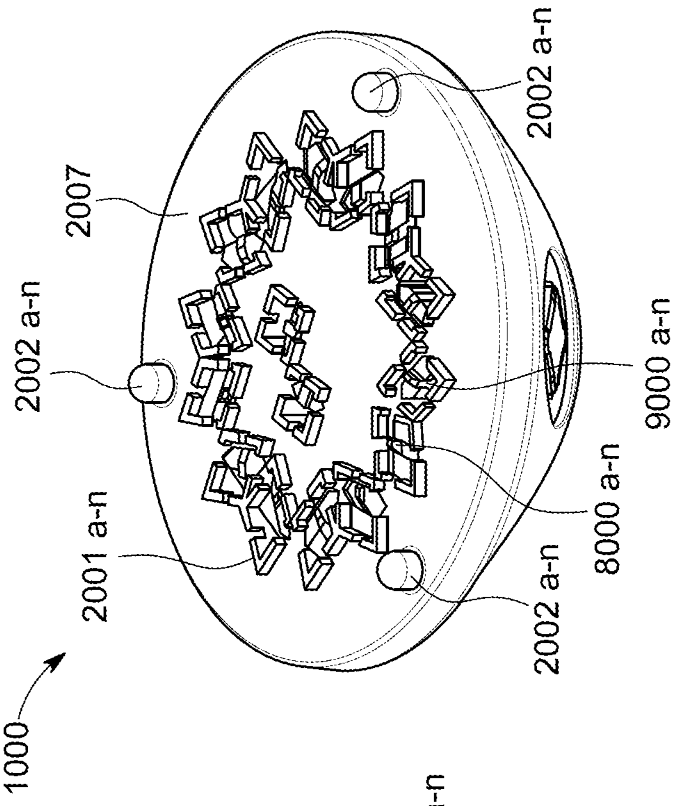
FIG. 16B depicts another view of the inventive assembly shown in FIG. 16A.
Figure 16D:
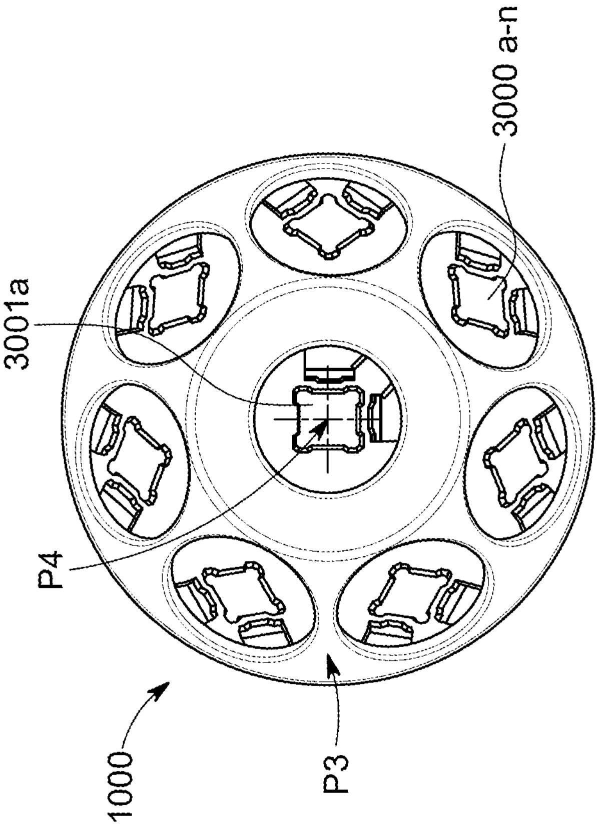
FIG. 16D depicts a top view of the inventive assembly shown in FIG. 16A.

The assembly 1000 may also comprise a plurality of dielectric filler elements 8000*a* to 8000*n* (e.g., one per antenna element), a plurality of dielectric elements 9000*a* to 9000*n* (e.g., one per antenna element) and a housing 2000 for enclosing and protecting elements 3000*a* to 3000*n*, 3001*a*, 8000*a* to 8000*n* and 9000*a* to 9000*n*, as well as providing ground reference and the correct spacing/pitch for the elements 3000*a* to 3000*n*, 3001*a*, among other elements (see FIG. 16D for exemplary pitch values).

The exemplary housing 2000 is shown comprising a single structure, though this too is merely exemplary. It should be understood that the housing 2000 may, alternatively, be composed of one or more connected structures, for example.

In an embodiment, the housing 2000 may be composed of a dielectric material having a dielectric constant and plating that facilitates proper electrical performance along with the correct physical and mechanical properties that facilitate proper mechanical and environmental performance (e.g., a liquid crystal polymer or "LCP"). In an alternative embodiment, the housing may be a diecast housing.

Turning now to FIG. 16B there is shown another view of assembly 1000. This view is of the bottom of assembly 1000. As shown, the assembly 1000 may comprise a plurality of electrical grounding structures 2001*a* to 2001*n* where each grounding structure is configured as an electrical ground for one antenna element 3000*a* to 3000*n* or 3001*a*, for example. In an embodiment, the grounding structures 2001*a* to 2001*n* may be composed of LCP to name just one non-limiting material, for example. In an embodiment, each of the grounding structures 2001*a* to 2001*n* may be configured to be connected to an electrical ground plane of a printed circuit board (PCB), for example.

Also shown are a plurality of assembly alignment structures 2002*a* to 2002*n* where each alignment structure is configured to be connected to a PCB to fix the assembly 1000 in position over the PCB. In an embodiment, the structures 2002*a* to 2002*n* may be composed of LCP to name just one non-limiting material, for example. Further, the height of a structure 2002*a* to 2002*n* may vary based on the thickness of a corresponding PCB to maintain mechanical alignment/attachment.

Figure 16C:
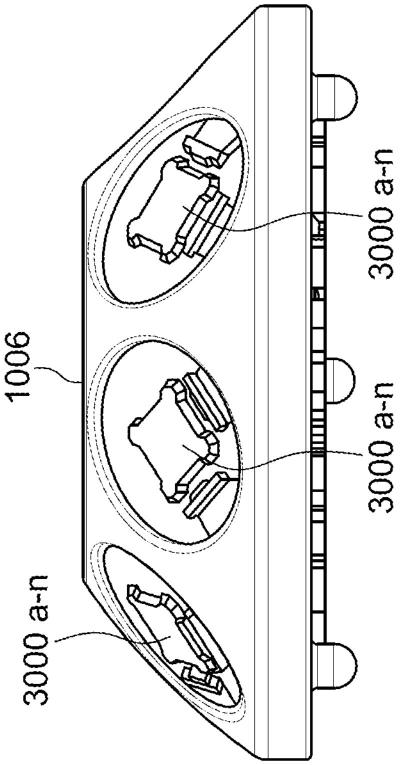
FIG. 16C depicts a side view, of the inventive assembly shown in FIG. 16A.

FIGS. 16C and 16D depict a side view and top view, respectively, of the assembly 1000. In FIG. 16D exemplary pitch values P3 and P4 are shown, where pitch value P3 is between respective 45 degree, orientation angle elements 3000*a* to 3000*n* and pitch value P4 is between every 45 degree, orientation angle element 3000*a* to 3000*n* and zero degree element 3001*a*. It should be understood that the pitch values P3 and P4 are merely exemplary and may be varied based on performance requirements for the assembly 1000, for example. FIGS. 16C and 16D also depict, non-limiting, exemplary dimensions of the assembly 1000.

Figure 17:
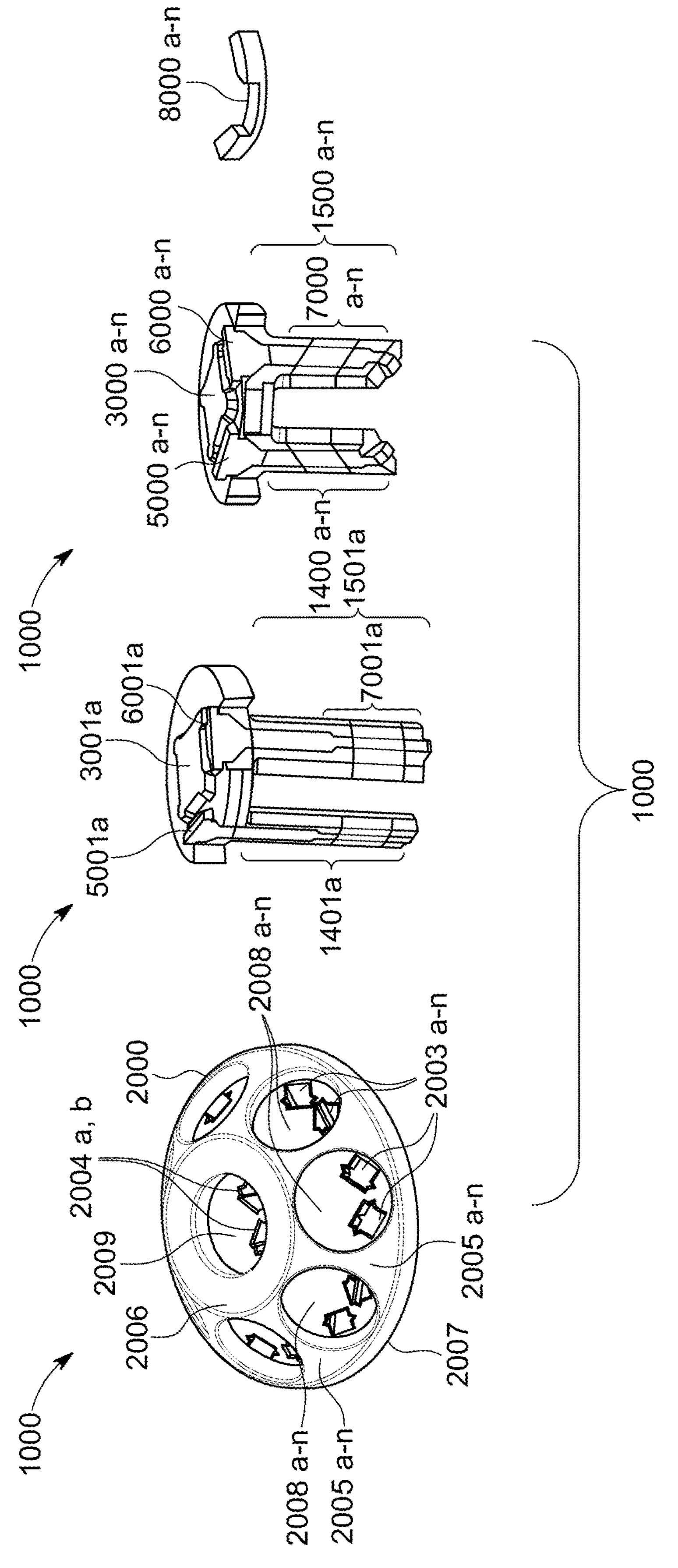
FIG. 17 illustrates the inventive assembly in FIG. 16A separated into its respective, exemplary components for ease of explanation.

Referring now to FIG. 17 there is illustrated assembly 1000 separated into its respective, exemplary components for ease of explanation.

As shown, housing 2000 may comprise a plurality of antenna pole apertures 2003*a* to 2003*n*, each aperture configured at a 45 degree orientation angle and is configured to receive an electrical pole of a dual-pole, antenna element 3000*a* to 3000*n* and at least two antenna pole apertures 2004*a, b* configured at a zero degree orientation angle, each configured to receive an electrical pole of a dual-pole, antenna element 3001*a*. In the embodiments shown herein the housing 2000 may be configured as a "saucer-shape", where the housing comprises a substantially flat, circular center top or first surface 2006 having a plurality of angled ribs 2005*a* to 2005*n* extending from the circumference of the surface 2006 towards a circumference of a substantially flat, circular bottom or second surface 2007. In an embodiment each rib 2005*a* to 2005*n* may be configured at a substantially 45 degree angle from the top surface 2006. Yet further, between adjacent ribs are configured angled, recessed surface portions 2008*a* to 2008*n*, where each angled, recessed surface portion 2008*a* to 2008*n* may be configured with at least two apertures 2003*a* to 2003*n* (for a dual pole embodiment) where the ribs and apertures are configured at an angle that corresponds to the angle of an element 3000*a* to 3000*n* (e.g., 45 degrees). Still further, the top surface 2006 may comprise at least one recessed portion 2009 configured with at least two apertures 2003*a* to 2003*n* where the surface 2006 and apertures 2004*a,b* are configured at an angle that corresponds to the angle of an element 3001*a* (e.g., zero degrees).

It should be understood that FIG. 17 depicts a dual-pole embodiment of an inventive assembly 1000. Alternatively, a similar housing may be configured for a single-pole assembly. In such a case, the housing may comprise a plurality of antenna pole apertures where each aperture is configured at a 45 degree orientation angle and is configured to receive an electrical pole of a single-pole, antenna element 3000*a* to 3000*n* and one antenna pole aperture configured at a zero degree orientation angle, each configured to receive an electrical pole of a single-pole, antenna element. In an embodiment, the single pole housing may be configured as a "saucer-shape", where the housing comprises a substantially flat, circular center top or first surface having a plurality of angled ribs extending from the circumference of the surface towards a circumference of a substantially flat, circular bottom or second surface. In an embodiment each rib may be configured at a substantially 45 degree angle from the top surface. Yet further, between adjacent ribs are configured angled, recessed surface portions, where each angled, recessed surface portion may be configured with one aperture (for a single-pole embodiment) where the ribs and apertures are configured at an angle that corresponds to the angle of an element (e.g., 45 degrees). Still further, the top surface may comprise at least one recessed portion configured with one aperture where the surface and aperture are configured at an angle that corresponds to the angle of an element (e.g., zero degrees).

It should be understood, however, that the saucer-shaped configuration of the housing 2000 is a non-limiting, exemplary shape and other shapes are within the scope of the disclosure. For example, the housing may comprise a donut-shaped housing as seen in FIGS. 20A to 20C and 21A to 21C.

Continuing, FIG. 17 also separately depicts an exemplary zero degree, orientation angle antenna element 3001*a* without its dielectric filler element removed from the housing 2000 and an exemplary 45 degree, orientation angle antenna element 3000*n* without a dielectric filler element 8000 removed from the housing 2000. Finally, FIG. 17 separately depicts a single dielectric filler element 8000. It should be understood that the description that follows applies to each 45 degree, orientation angle antenna element 3000*a* to 3000*n*.

As shown, 45 degree, orientation angle antenna element 3000*n* may be capacitively coupled or directly attached to dual poles 5000*n*, 6000*n*, where it is understood that one pole allows an exemplary antenna to transmit or receive electromagnetic signals, at certain frequencies, that are polarized along one linear axis (e.g., x-axis) and the other pole allows the patch antenna to transmit or receive electromagnetic signals that are polarized along another orthogonal linear axis (e.g., y-axis)(i.e., the relative orthogonal orientation of each individual pole within each pair is representative of a dual-pole antenna configuration).

Antenna element 3000*n* may comprise lengthwise portion 1400*n* for pole 5000*n* and lengthwise portion 1500*n* for pole 6000*n* for example.

In an embodiment, each lengthwise portion 1400*n*, 1500*n* may comprise an exemplary tuning section 7000*n*. In accordance with an embodiment, the tuning section 7000*n* functions to affect the electromagnetic properties of each pole 5000*n*, 6000*n*. In an embodiment, a tuning section may comprise a so-called "dog bone" shaped section that functions to affect the electromagnetic coupling properties of each pole (e.g., the longer the "dog bone" section, the more of an effect on a dipole). In this manner electromagnetic properties of a single or dual pole antenna may be controlled in order to achieve a desired set of design criteria (e.g., maximize the return loss (minimize reflections) of each electrical pole for optimum overall performance).

Similarly, the exemplary zero-degree orientation angle antenna element 3001*a* may be capacitively coupled or directly attached to dual poles 5001*a*, 6001*a*, where, again, it should be understood that one pole allows the exemplary antenna to transmit or receive electromagnetic signals, at certain frequencies, that are polarized along one linear axis (e.g., x-axis) and the other pole allows the patch antenna to transmit or receive electromagnetic signals that are polarized along another orthogonal linear axis (e.g., y-axis)(i.e., the relative orthogonal orientation of each individual pole within each pair is representative of a dual-pole antenna configuration).

Antenna element 3001*a* may comprise lengthwise portion 1401*a* for pole 5001*a* and lengthwise portion 1501 an for pole 6001*a*, for example.

In an embodiment, each lengthwise portion 1401*a*, 1501*a* may comprise an exemplary tuning section 7001*a*. In accordance with an embodiment, the tuning section 7001*a* functions to affect the electromagnetic properties of each pole 5001*a*, 6001*a*. In an embodiment, a tuning section may comprise a so-called "dog bone" shaped section that functions to affect the electromagnetic coupling properties of each pole (e.g., the longer the "dog bone" section, the more of an effect on a dipole). In this manner electromagnetic properties of a single or dual pole antenna may be controlled in order to achieve a desired set of design criteria (e.g., maximize the return loss (minimize reflections) of each electrical pole for optimum overall performance).

In addition to the elements described above, FIG. 17 depicts an exemplary dielectric filler element 8000*n*. In an embodiment, each dielectric filler element 8000*a* to 8000*n* associated with each antenna element 3000*a* to 3000*n* and 3001*a* may be configured between a respective dual pole pair (e.g., between pole 5000*n* and pole 6000*n* or between pole 5001*a* and pole 6001*a* and housing 2000).

In an embodiment, a dielectric filler element 8000*a* to 8000*n* associated with each pole of an antenna element may function to fill an air gap so as to control the impedance of individual poles 5000*a* to 5000*n*, 6000*a* to 6000*n* or 5001*a*, 6001*a*, and may be composed of material consisting of a dielectric constant that functions to provide the correct physical and mechanical properties that facilitate a desired electrical, mechanical and environmental performance (e.g., an LCP an example of which is made by the Celanese Corporation, Model LKX1761, Zenite LCP).

As shown, a dielectric filler element 8000*n* may comprise a single structure, though, alternatively, the single structure may be separated into at least two structures. It should be understood that in embodiments, inventive dielectric filler elements may be configured as (i) a separate piece and assembled to a housing as an individual piece, and/or, (ii) assembled to an antenna so as to create an antenna subassembly that is then assembled to a housing. Yet further, in another embodiment a dielectric filler element may not be required because the geometry of the antenna component and/or housing(s) does not need impedance control (i.e., are configured to control impedance without the need for a filler).

In the figures, each of the exemplary dielectric filler elements 8000*a* to 8000*n* may be configured as a curved-shaped element such that when inserted, each element is frictionally fixed between a portion of the circumference of recessed portions 2008*a* to 2008*n* or 2009 and respective poles associated with an antenna element.

It should be understood that each tuning section 7000*a* to 7000*n*, 7001*a* may be formed as a multi-layer section, where an exemplary conductive layer (e.g., gold) may be formed over an exemplary diffusion barrier layer (e.g., nickel). As explained previously, a conductive layer may be removed or stripped in a post-plating process (or never added initially) by a laser, for example. As a result, the diffusion barrier layer of each tuning section will be exposed to the atmosphere allowing oxides to form on the exposed layer. As indicated previously, such a stripped section of the pole may be referred to as an "anti-wicking" section that improves the reliability of the solder joint. Said another way, when oxides are not formed (when the conductive layer is not stripped away) solder may be drawn up or "wicked up" the pole away from the joint, resulting in less solder remaining at the solder joint and leading to a weakened joint (i.e., decreased reliability of the solder joint).

As indicated previously, if solder is allowed to be drawn up a pole (if no anti-wicking section is present), the solder may not be uniformly distributed over the portion of the pole where it is flowing or has flowed. Such a non-uniform distribution may negatively impact the electrical performance (return loss, dielectric withstanding voltage) of a pole, and, thus, the inventive assembly 1000. Conversely, the incorporation of anti-wicking sections into a pole removes the issue of the non-uniform distribution of solder and improves electrical performance because substantially no solder is allowed to flow up a pole.

Figure 18B:
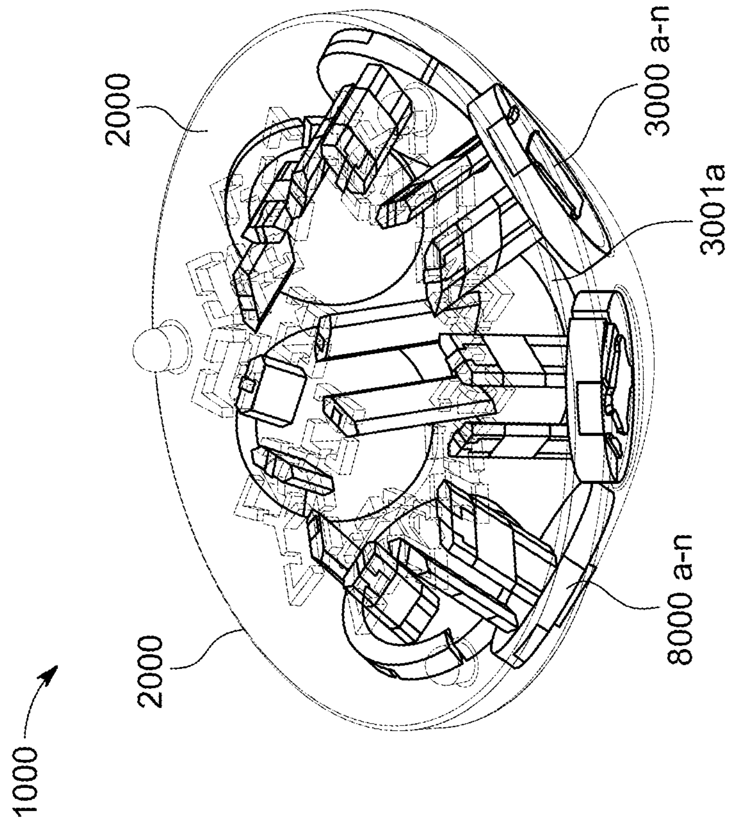
FIG. 18B illustrates a bottom isometric view of the inventive assembly shown in FIG. 16A with a transparent housing.
Figure 18A:
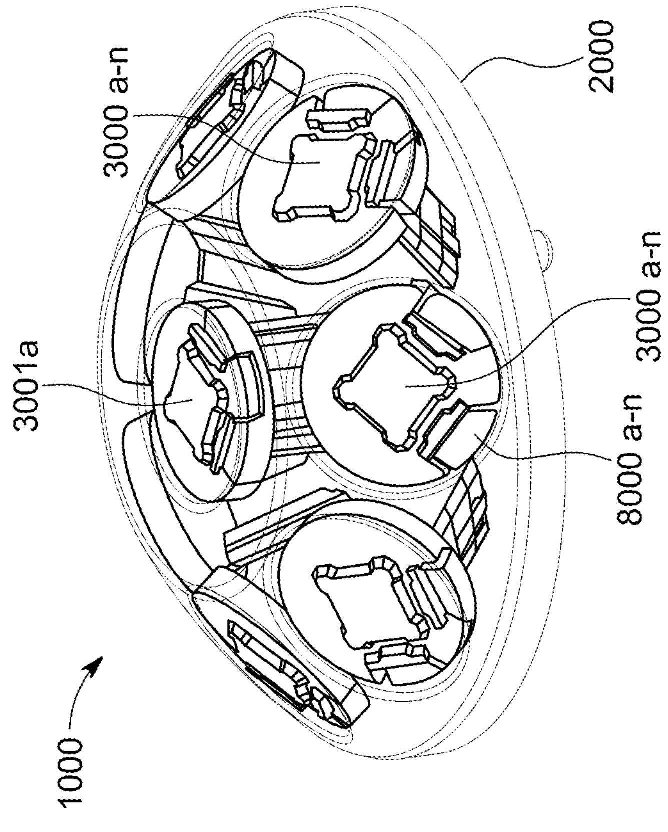
FIG. 18A illustrates a top isometric view of the inventive assembly shown in FIG. 16A with a transparent housing.
Figure 18C:
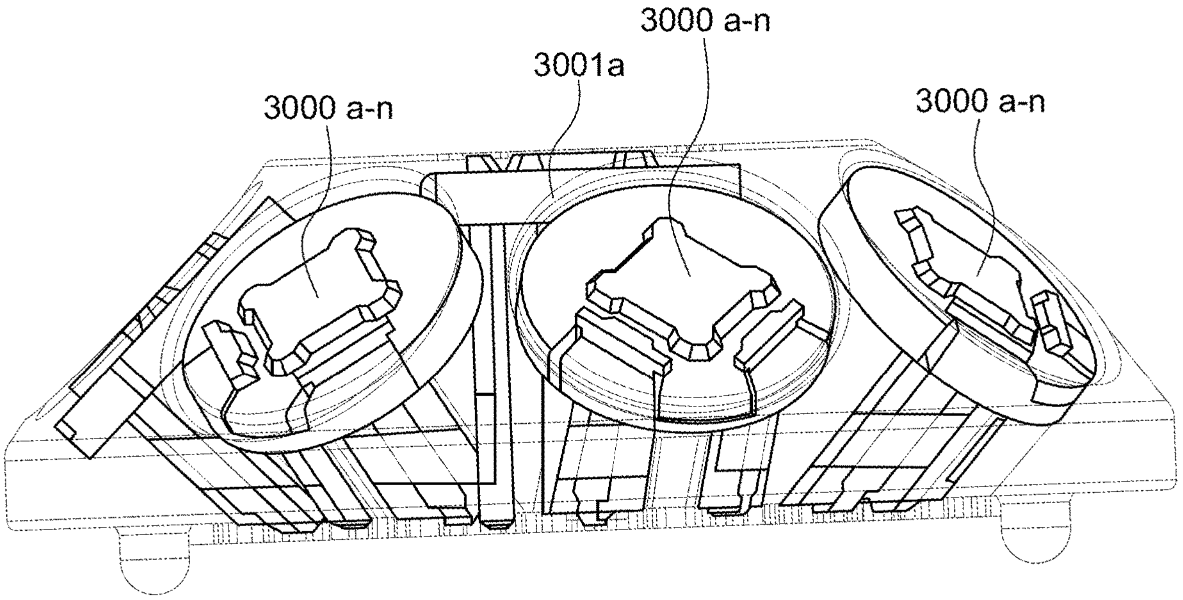
FIG. 18C illustrates a side isometric view of the inventive assembly shown in FIG. 16A with a transparent housing.

Referring to FIGS. 18A to 18C there are illustrated top, bottom and side isometric views of assembly 1000 where the housing 2000 is transparent. It should be understood that the transparent housing 2000 is shown in order to allow the reader to see how the components of the assembly 1000 are configured and enclosed by the housing 2000.

Figure 19A:
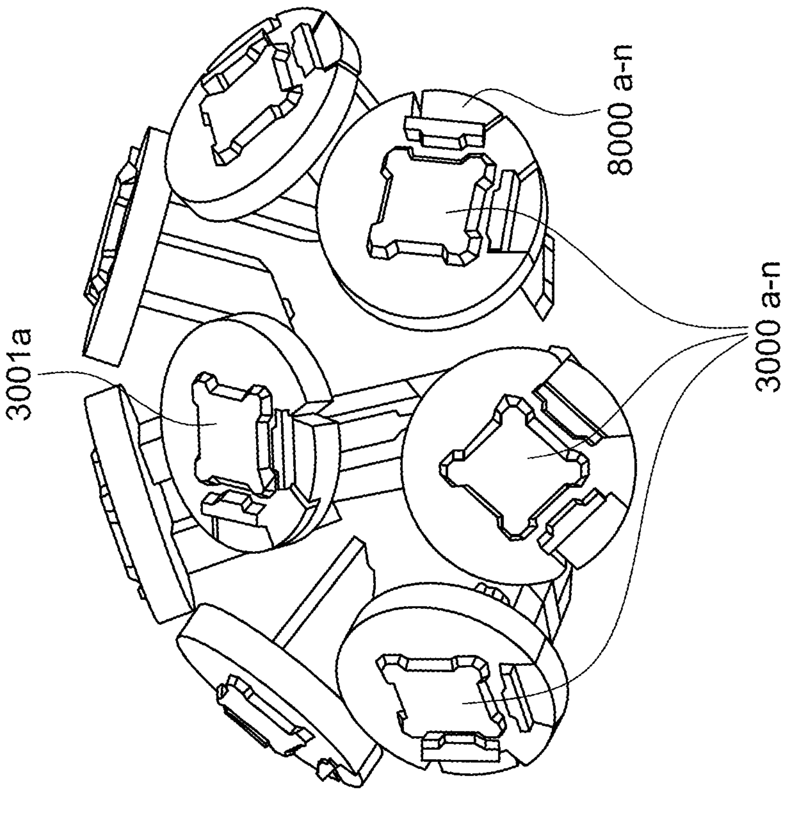
FIG. 19A illustrates another top view of the inventive assembly shown in FIG. 16A with the housing removed.
Figure 19B:
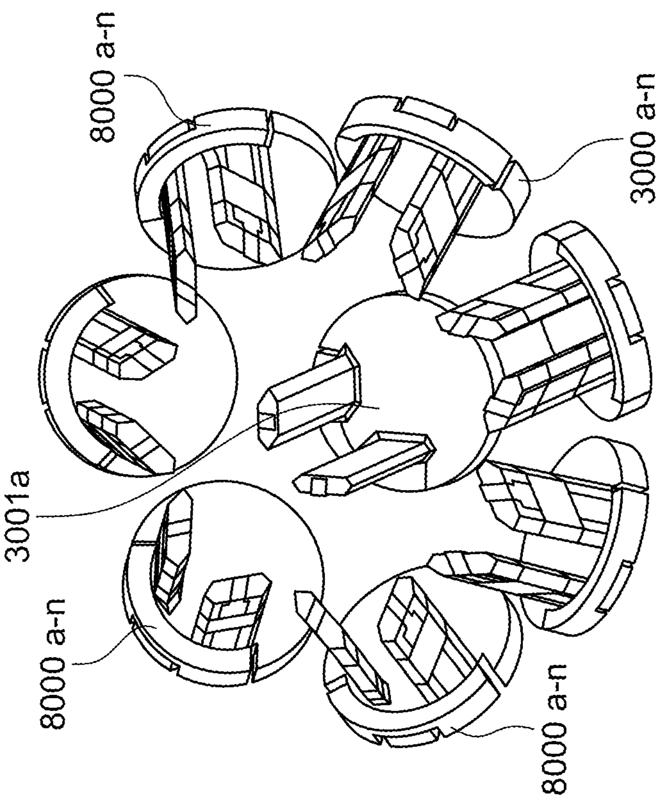
FIG. 19B illustrates another bottom view, of the inventive assembly shown in FIG. 16A with the housing removed.

Similarly, FIGS. 19A and 19B illustrate yet additional top and bottom views, respectively, that illustrate how the components of the assembly 1000 are configured (e.g., at a 45 degree orientation angle, except a central element 3001*a*), this time with the housing removed entirely.

Figure 20A:
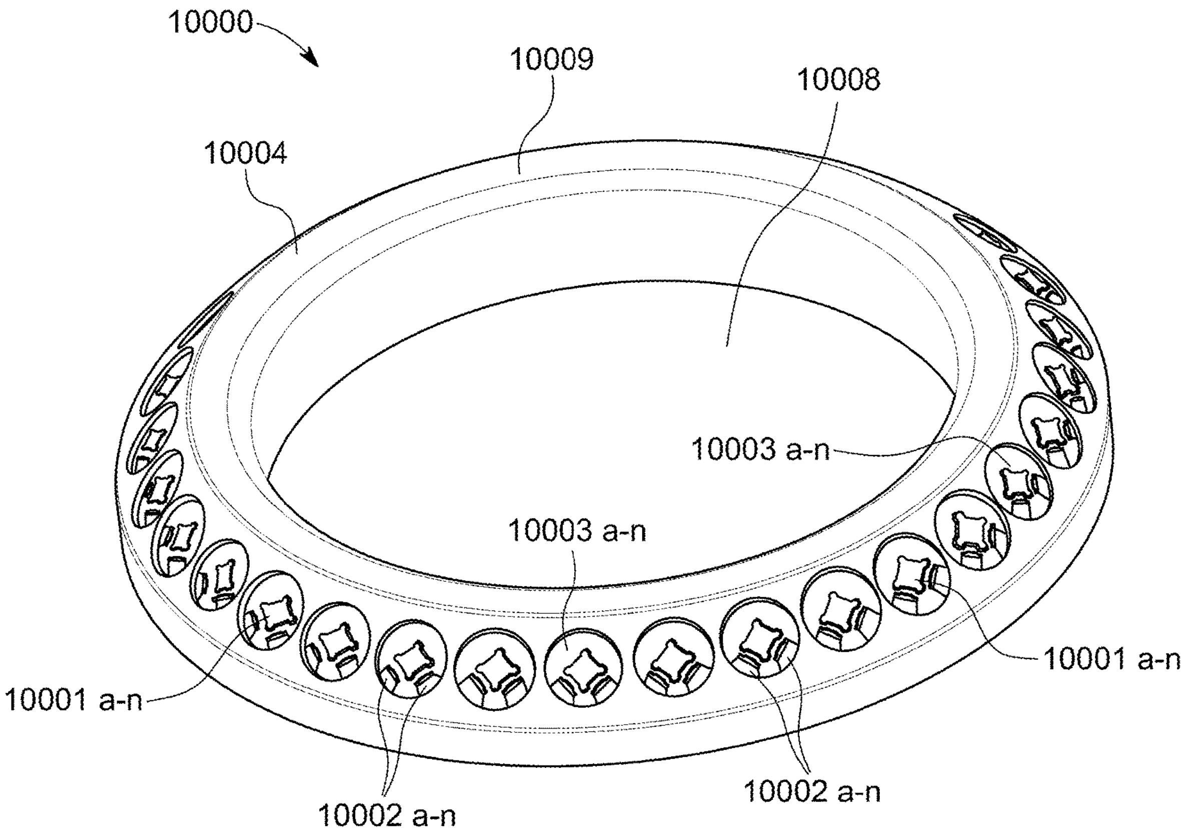
FIG. 20A depicts another exemplary, inventive integrated antenna assembly.

Referring now to FIG. 20A there is depicted yet another embodiment of an exemplary, inventive integrated antenna assembly 10000 according to an embodiment. As depicted, the assembly 10000 may comprise a plurality of single or dual pole antenna elements 10001*a* to 10001*n* (where "n" indicates a last antenna element) that mechanically and electrically connect to telecommunications equipment (not shown; e.g., transmitters, receivers) operating, for example, at millimeter-wave frequencies. Exemplary, non-limiting operating frequency bands are provided above in Table 1. One exemplary application for the inventive antenna assembly 10000 is as a wireless radio hub, for example. Notwithstanding such frequency ranges, it should be understood that the exemplary antenna assembly 10000 may operate at frequencies below the ranges above (e.g., below 6000 MHz frequency).

As FIG. 20A depicts, the exemplary antenna assembly 10000 may comprise a plurality of antenna elements 10001*a* to 10001*n* configured at a 45 degree orientation angle (e.g., 8, 16 or 32 elements) from a vertical axis. In comparison with the assembly 1000 described earlier, no antenna element is configured at a zero degree, orientation angle.

Figure 21A:
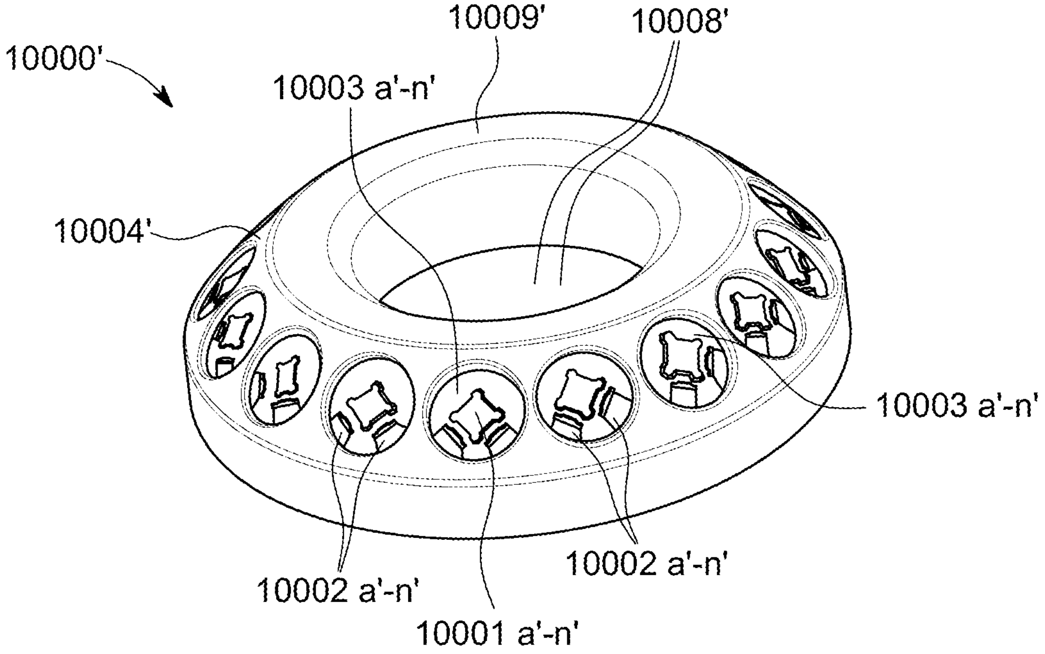
FIG. 21A depicts another exemplary, inventive integrated antenna assembly.
Figure 21B:
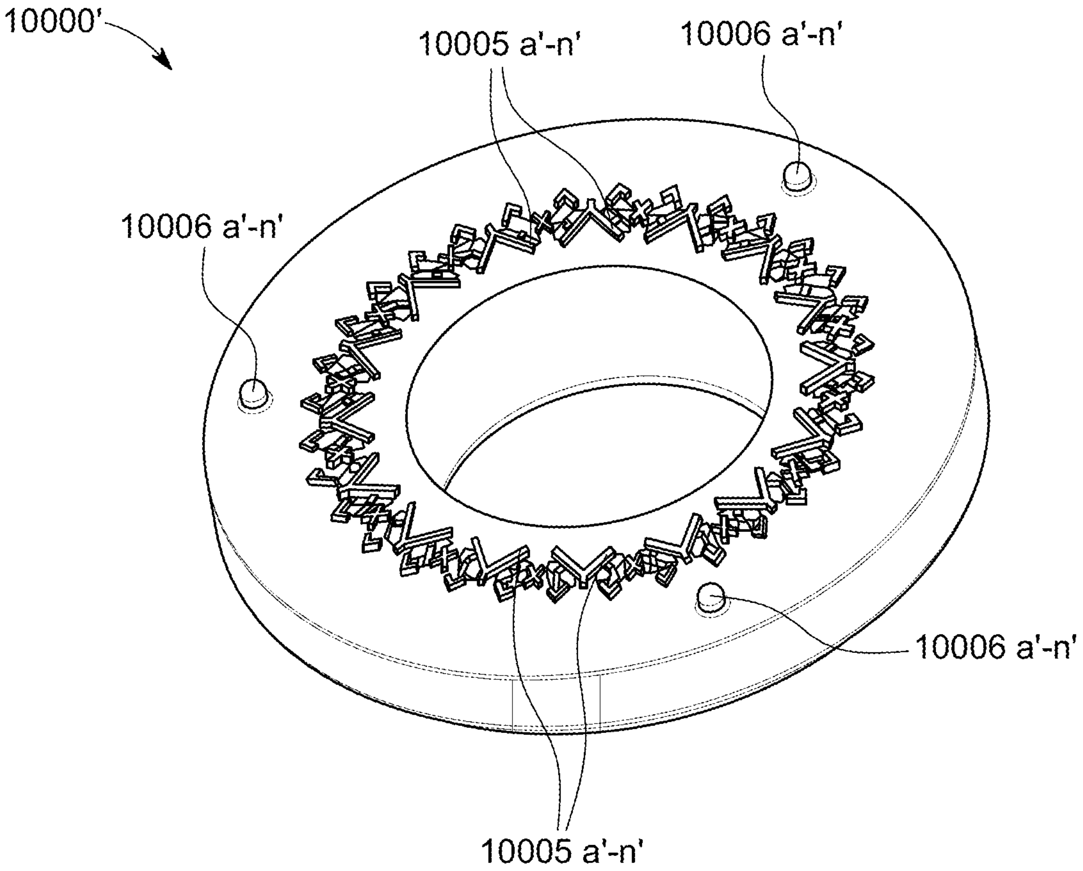
FIG. 21B depicts another exemplary, inventive integrated antenna assembly.
Figure 21C:
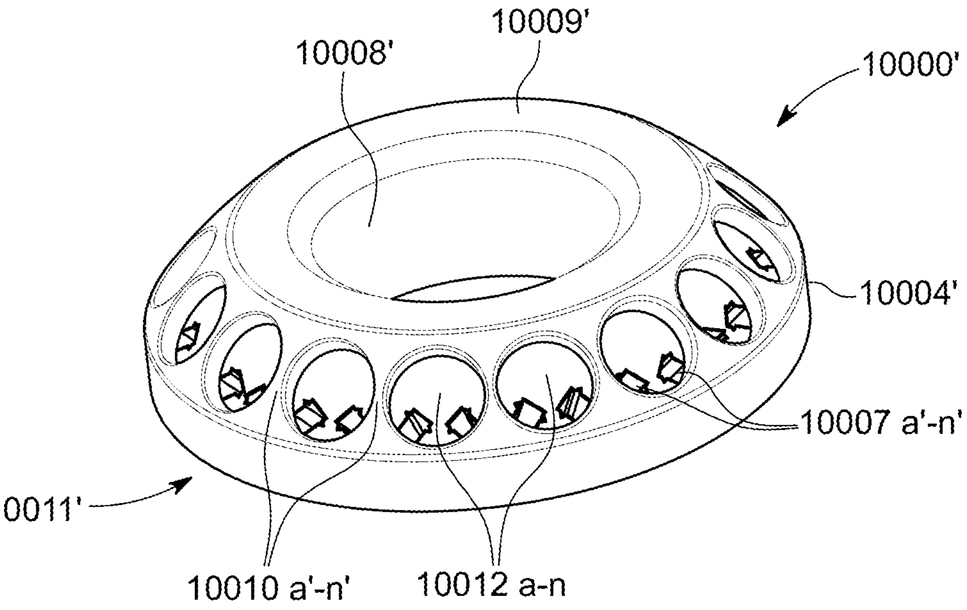
FIG. 21C depicts an antenna housing according to an embodiment.

In the embodiment depicted in FIG. 20A, the assembly 10000 includes thirty-two antenna elements 10001*a* to 10001*n* though this is merely exemplary and more, or less, elements may be included in an inventive assembly (e.g., 4, 16, an example of the latter is depicted in FIGS. 21A to 21C).

The assembly 10000 may also comprise a plurality of dielectric filler elements 10002*a* to 10002*n* (e.g., one per antenna element), a plurality of dielectric elements 10003*a* to 10003*n* (e.g., one per antenna element) and a housing 10004 for enclosing and protecting elements 10001*a* to 10001*n*, 10002*a* to 10002*n* and 10003*a* to 10003*n*, as well as providing ground reference and the correct spacing/pitch for the elements 10001*a* to 10001*n*, among other elements.

The exemplary housing 10004 is shown comprising a single structure, though this too is merely exemplary. It should be understood that the housing 10004 may, alternatively, be composed of more than one connected structures, for example.

In an embodiment, the housing 10004 may be composed of a dielectric material having a dielectric constant and plating that facilitates proper electrical performance along with the correct physical and mechanical properties that facilitate proper mechanical and environmental performance (e.g., a liquid crystal polymer or "LCP"). In an alternative embodiment, the housing may be a diecast housing.

Figure 20B:
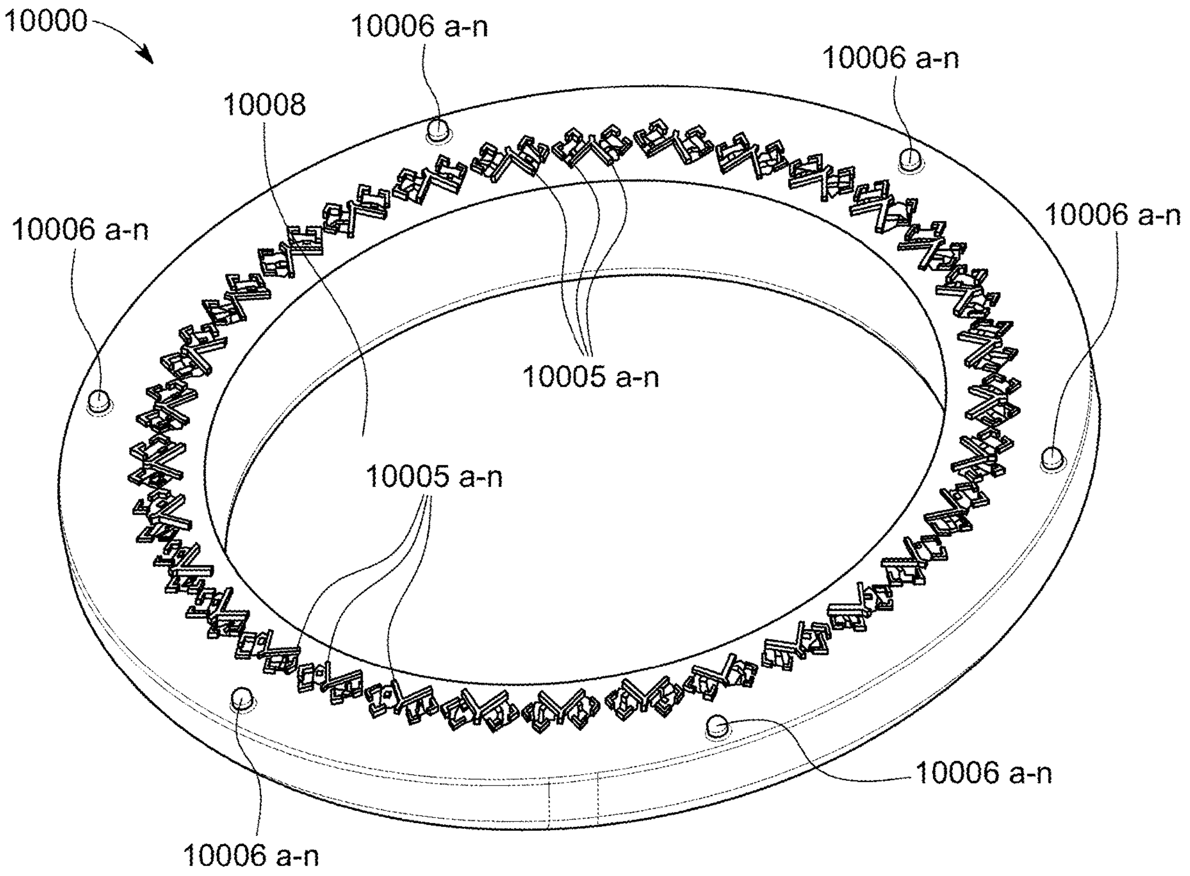
FIG. 20B depicts another exemplary, inventive integrated antenna assembly.

Turning now to FIG. 20B there is shown another view of assembly 10000. This view is of the bottom of assembly 10000. As shown, the assembly 10000 may comprise a plurality of electrical grounding structures 10005*a* to 10005*n* where each grounding structure is configured as an electrical ground for one antenna element 10001*a* to 10001*n*, for example. In an embodiment, the grounding structures 10005*a* to 10005*n* may be composed of LCP to name just one non-limiting material, for example. In an embodiment, each of the grounding structures 10005*a* to 10005*n* may be configured to be connected to an electrical ground plane of a printed circuit board (PCB), for example.

Also shown are a plurality of assembly alignment structures 10006*a* to 10006*n* where each alignment structure is configured to be connected to a PCB to fix the assembly 10000 in position over the PCB. In an embodiment, the structures 10006*a* to 10006*n* may be composed of LCP to name just one non-limiting material, for example. Further, the height of a structure 10006*a* to 10006*n* may vary based on the thickness of a corresponding PCB to maintain mechanical alignment/attachment.

In embodiments, the pitch values for the antenna elements 10001*a* to 10001*n* may be similar to the pitch values of elements 3000*a* to 3000*n* of assembly 1000, for example, it being understood that the pitch values are merely exemplary and may be varied based on performance requirements for the assembly 10000, for example.

Figure 20C:
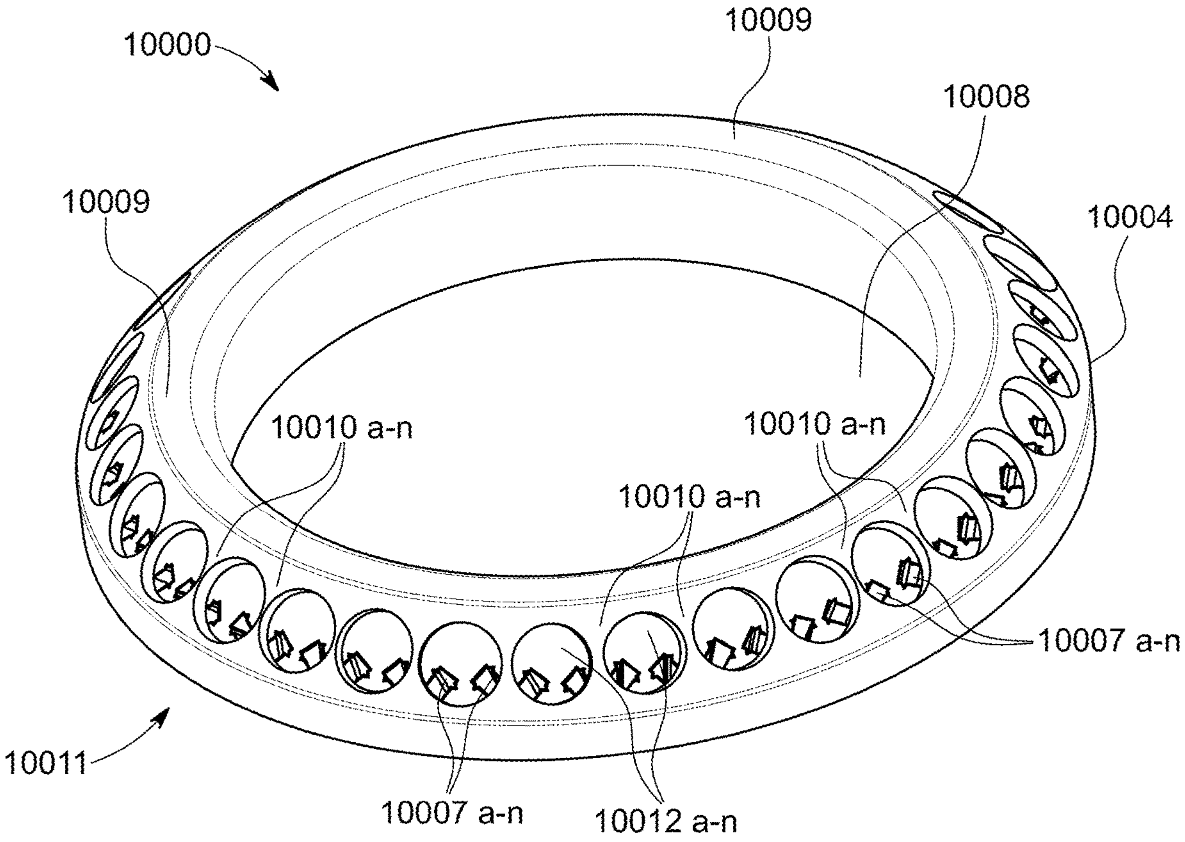
FIG. 20C depicts an antenna housing according to an embodiment.

Referring now to FIG. 20C there is illustrated the housing 10004 of assembly 10000.

As shown, housing 10004 may comprise a plurality of antenna pole apertures 10007*a* to 10007*n*, each aperture configured at a 45 degree orientation angle and is configured to receive an electrical pole of a dual-pole, antenna element 10001*a* to 10001*n* (for a single pole embodiment, just a single aperture). In the embodiments shown the housing 10004 may be configured as a "donut-shape", where the housing has an opening 10008 in a substantially flat, central perimeter structure 10009.

Yet further, the housing 10004 may comprise a plurality of angled ribs 10010*a* to 10010*n* extending from the circumference of the structure 10009 towards a circumference of a substantially flat, circular bottom surface 10011. In an embodiment each rib 10010*a* to 10010*n* may be configured at a substantially 45 degree angle from the top structure 10009. Yet further, between adjacent ribs are configured angled, recessed surface portions 10012*a* to 10012*n*, where each angled, recessed surface portion 10012*a* to 10012*n* may be configured with at least two apertures 10007*a* to 10007*n* (for a dual pole embodiment; for a single-pole embodiment, just a single aperture) where the ribs and apertures are configured at an angle that corresponds to the angle of an element 10001*a* to 10001*n* (e.g., 45 degrees).

Again, it should be understood that FIG. 20C depicts a dual-pole embodiment of an inventive assembly 10000. Alternatively, a similar housing may be configured for a single-pole assembly. In such a case, the housing may comprise a plurality of antenna pole apertures where each aperture is configured at a 45 degree orientation angle and is configured to receive an electrical pole of a single-pole, antenna element 10001*a* to 10001*n*. In an embodiment, the housing may be configured as a "donut-shape" as described previously, Further, such a single-pole embodiment may comprise a plurality of angled ribs extending from the circumference of the central, perimeter structure towards a circumference of a substantially flat, circular bottom or surface. In an embodiment each rib may be configured at a substantially 45 degree angle from the top structure. Yet further, between adjacent ribs are configured angled, recessed surface portions, where each angled, recessed surface portion may be configured with one aperture (for a single-pole embodiment) where the ribs and apertures are configured at an angle that corresponds to the angle of an element (e.g., 45 degrees).

In the embodiment depicted in FIGS. 21A, to 21C the assembly 10000' includes sixteen antenna elements 10001*a*' to 10001*n*' instead of thirty two antenna elements as in assembly 10000 in FIG. 20A to 20C though this is merely exemplary and more, or less, elements may be included in an inventive assembly. While the total number and size of antenna elements 10001*a*' to 10001*n*' and their related components (e.g., apertures, ribs, recessed surface portions) in assembly 10000' may be different than those in assembly 10000, the function of the elements 10001*a*' to 10001*n*' and their related components (e.g., apertures, ribs, recessed surface portions) is substantially the same as the elements 10001*a* to 10001*n* and their related components (e.g., apertures, ribs, recessed surface portions) in assembly 10000.

It should be understood that the assemblies 10000 and 10000' shown in FIGS. 20A to 20C and 21A to 21C may comprise 45 degree, orientation angle antenna elements that are similar to elements 3000*a* to 3000*n* described previously. For example, each element 10001*a* to 10001*n* and 10001*a*' to 10001*n*' may be capacitively coupled or directly attached to dual poles or a single pole, where (for the dual pole embodiment) it is understood that one pole allows an exemplary antenna to transmit or receive electromagnetic signals, at certain frequencies, that are polarized along one linear axis (e.g., x-axis) and the other pole allows the patch antenna to transmit or receive electromagnetic signals that are polarized along another orthogonal linear axis (e.g., y-axis) (i.e., the relative orthogonal orientation of each individual pole within each pair is representative of a dual-pole antenna configuration).

Further, each antenna element in a dual pole embodiment may comprise a lengthwise portion for each pole, for example. In an embodiment, each lengthwise portion may comprise an exemplary tuning section. In accordance with an embodiment, as described previously the tuning section functions to affect the electromagnetic properties of each pole. In an embodiment, a tuning section may comprise a so-called "dog bone" shaped section that functions to affect the electromagnetic coupling properties of each pole (e.g., the longer the "dog bone" section, the more of an effect on a dipole). In this manner electromagnetic properties of a single or dual pole antenna may be controlled in order to achieve a desired set of design criteria (e.g., maximize the return loss (minimize reflections) of each electrical pole for optimum overall performance).

In addition, each antenna element may comprise a dielectric filler element. In an embodiment, each dielectric filler element associated with each antenna element may be configured between a respective dual pole pair or configured with a single pole.

In an embodiment, a dielectric filler element associated with each pole of an antenna element may function to fill an air gap so as to control the impedance of individual poles, and may be composed of material consisting of a dielectric constant that functions to provide the correct physical and mechanical properties that facilitate a desired electrical, mechanical and environmental performance (e.g., an LCP an example of which is made by the Celanese Corporation, Model LKX1761, Zenite LCP).

Such a dielectric filler element may comprise a single structure, though, alternatively, the single structure may be separated into at least two structures. It should be understood that in embodiments, inventive dielectric filler elements may be configured as (i) a separate piece and assembled to a housing as an individual piece, and/or, (ii) assembled to an antenna so as to create an antenna sub-assembly that is then assembled to a housing. Yet further, in another embodiment a dielectric filler element may not be required because the geometry of the antenna component and/or housing(s) does not need impedance control (i.e., are configured to control impedance without the need for a filler).

Still further, each exemplary dielectric filler element may be configured as a curved-shaped element such that when inserted, each element is frictionally fixed between a portion of the circumference of recessed portions 10012*a* to 10012*n* and 10012*a*' to 10012*n*' and respective poles associated with an antenna element.

It should be understood that each tuning section may be formed as a multi-layer section, where an exemplary conductive layer (e.g., gold) may be formed over an exemplary diffusion barrier layer (e.g., nickel). As explained previously, a conductive layer may be removed or stripped in a post-plating process (or never added initially) by a laser, for example. As a result, the diffusion barrier layer of each tuning section will be exposed to the atmosphere allowing oxides to form on the exposed layer. As indicated previously, such a stripped section of the pole may be referred to as an "anti-wicking" section that improves the reliability of the solder joint. Said another way, when oxides are not formed (when the conductive layer is not stripped away) solder may be drawn up or "wicked up" the pole away from the joint, resulting in less solder remaining at the solder joint and leading to a weakened joint (i.e., decreased reliability of the solder joint).

A indicated previously, if solder is allowed to be drawn up a pole (if no anti-wicking section is present), the solder may not be uniformly distributed over the portion of the pole where it is flowing or has flowed. Such a non-uniform distribution may negatively impact the electrical performance (return loss, dielectric withstanding voltage) of a pole, and, thus, the inventive assembly 10000 or 10000'. Conversely, the incorporation of anti-wicking sections into a pole removes the issue of the non-uniform distribution of solder and improves electrical performance because substantially no solder is allowed to flow up a pole.

While benefits, advantages, and solutions have been described above with regard to specific embodiments of the disclosure, it should be understood that such benefits, advantages, and solutions and any element(s) that may cause or result in such benefits, advantages, or solutions, or cause such benefits, advantages, or solutions to become more pronounced are not to be construed as a critical, required, or an essential feature or element of any or all the claims appended to the present disclosure or that result from the present disclosure.

We claim:

1. An integrated antenna assembly comprising:

a plurality of antenna elements, a plurality of dielectric filler elements, a plurality of dielectric elements, and a housing that encloses and protects the plurality of antenna elements, dielectric filler elements, and dielectric elements and provides a ground reference for the assembly, wherein a single dielectric filler element among the plurality of dielectric filler elements is positioned at a corner of an antenna aperture in the housing and fills an air gap between each pole of a dual pole pair of an antenna element among the plurality of antenna elements and a respective side of the antenna aperture in the housing of the integrated antenna assembly.

2. The antenna assembly as in claim 1 wherein the antenna elements comprise rectangular patch antenna elements.

3. The antenna assembly as in claim 1 wherein the antenna elements operate over one or more of the following frequency bands:

DC to 6000 MHz;

24250 MHz to 27500 MHZ;

26500 MHz to 29500 MHz;

27500 MHz to 28350 MHz;

37000 MHz to 40000 MHz; and

39500 MHz to 43500 MHz.

4. The antenna assembly as in claim 1 wherein the housing is a first housing and is provided with one or more first connecting elements that connect to one or more second connecting elements of a second housing.

5. The antenna assembly as in claim 4 in which the one or more first connecting elements are male connecting elements and the one or more second connecting elements are female connecting elements.

6. The antenna assembly as in claim 1 wherein the antenna elements are configured at an orientation angle of between 0 and 90 degrees from a vertical axis of the antenna assembly.

7. The antenna assembly as in claim 1 wherein the antenna elements are configured at an orientation angle of 75 degrees from a vertical axis of the integrated antenna assembly.

8. The antenna assembly as in claim 1 wherein a number of the plurality of antenna elements are configured at an orientation angle of 45 degrees from a vertical axis of the integrated antenna assembly.

9. The antenna assembly as in claim 1 further comprising a plurality of dual pole pairs, wherein each of the antenna elements is capacitively coupled or directly attached to a dual pole pair among the plurality of dual pole pairs.

10. The antenna assembly as in claim 9 wherein each of the dual pole pair among the plurality of dual pole pairs comprises a tuning section that affects electromagnetic properties of the dual pole pair.

11. The antenna assembly as in claim 10 wherein each tuning section comprises a conductive layer formed over a diffusion barrier layer.

12. The antenna assembly as in claim 10 wherein each tuning section comprises a stripped conductive layer and a diffusion layer to prevent solder from being drawn up a respective pole of the tuning section.

13. The antenna assembly as in claim 1 wherein each of the dielectric filler elements is associated with a respective dual pole pair of an antenna element to control an impedance of the respective dual pole pair.

14. The antenna element as in claim 1 wherein each dielectric filler element is composed of an LCP material.

15. The antenna assembly as in claim 1 wherein each of the dielectric filler elements comprises at least two structures.

16. The antenna assembly as in claim 1 wherein the housing is configured as a saucer-shape.

17. The antenna assembly as in claim 16 wherein the housing comprises a substantially flat, circular center top surface having a plurality of angled ribs extending from the circumference of the surface towards a circumference of a substantially flat, circular bottom surface.

18. The antenna assembly as in claim 17 wherein each rib is configured at a substantially 45 degree angle from the top surface.

19. The antenna assembly as in claim 18 further comprising configured angled, recessed surface portions between adjacent ribs.

20. The antenna assembly as in claim 19 wherein each angled, recessed surface portion is configured with one aperture, and where the ribs and aperture are configured at an angle that corresponds to 45 degrees.

* * * * *